US006189078B1

(12) United States Patent
Bauman et al.

(10) Patent No.: US 6,189,078 B1
(45) Date of Patent: Feb. 13, 2001

(54) SYSTEM AND METHOD FOR INCREASING DATA TRANSFER THROUGHPUT FOR CACHE PURGE TRANSACTIONS USING MULTIPLE DATA RESPONSE INDICATORS TO MAINTAIN PROCESSOR CONSISTENCY

(75) Inventors: Mitchell A. Bauman, Circle Pines; Michael L. Haupt, Roseville, both of MN (US)

(73) Assignee: Unisys Corporation, Blue Bell, PA (US)

(*) Notice: Under 35 U.S.C. 154(b), the term of this patent shall be extended for 0 days.

(21) Appl. No.: 09/218,813

(22) Filed: Dec. 22, 1998

(51) Int. Cl.$^7$ ...................................................... G06F 13/00
(52) U.S. Cl. ........................ 711/156; 711/163; 711/207; 711/208; 711/108; 711/144; 710/5; 710/33; 709/233
(58) Field of Search ........................... 711/156–158, 154, 711/144, 147, 163, 206, 207, 208, 108; 710/5, 33, 60; 709/213, 233, 234

(56) References Cited

U.S. PATENT DOCUMENTS

| 5,603,005 | * | 2/1997 | Bauman et al. | 711/124 |
|---|---|---|---|---|
| 5,809,533 | * | 9/1998 | Tran et al. | 711/141 |
| 5,960,455 | * | 9/1999 | Bauman | 711/120 |
| 6,061,767 | * | 5/2000 | Kuo et al. | 711/156 |
| 6,070,200 | * | 5/2000 | Gates et al. | 710/20 |

* cited by examiner

Primary Examiner—Eddie P. Chan
Assistant Examiner—Hong Kim
(74) Attorney, Agent, or Firm—Charles A. Johnson; Mark T. Starr; Altera Law Group

(57) ABSTRACT

A system and method for reducing data transfer delays in a transaction processing system is provided. The system includes a plurality of devices each having an associated local memory, and a supervisory memory module having a main storage module for storing data segments and a directory storage for maintaining ownership status of each data segment stored in the main storage module and the local memories. A second device makes a request for a data segment which is stored in a first local memory of a first device. A data transfer request for the requested data segment is transferred from the second device to the supervisory memory module, where the data transfer request includes an identifier requesting permission to modify the requested data segment. The requested data and a data transfer response is delivered to the second device upon receipt of the data transfer request, where the data transfer response provides modification privileges of the requested data segment to the second device. A purge command is issued to the first device to invalidate the copy of the requested data segment in the first local memory. Upon issuance of the purge command to the first device, a purge acknowledge response is delivered to the second device, where the purge acknowledge response provides an indication that the copy of the requested data in the first local memory has been invalidated. The second device is prohibited from releasing any modified data until the purge acknowledge response is received.

19 Claims, 13 Drawing Sheets

SUB-PROCESSING MODULE (SUB-POD)

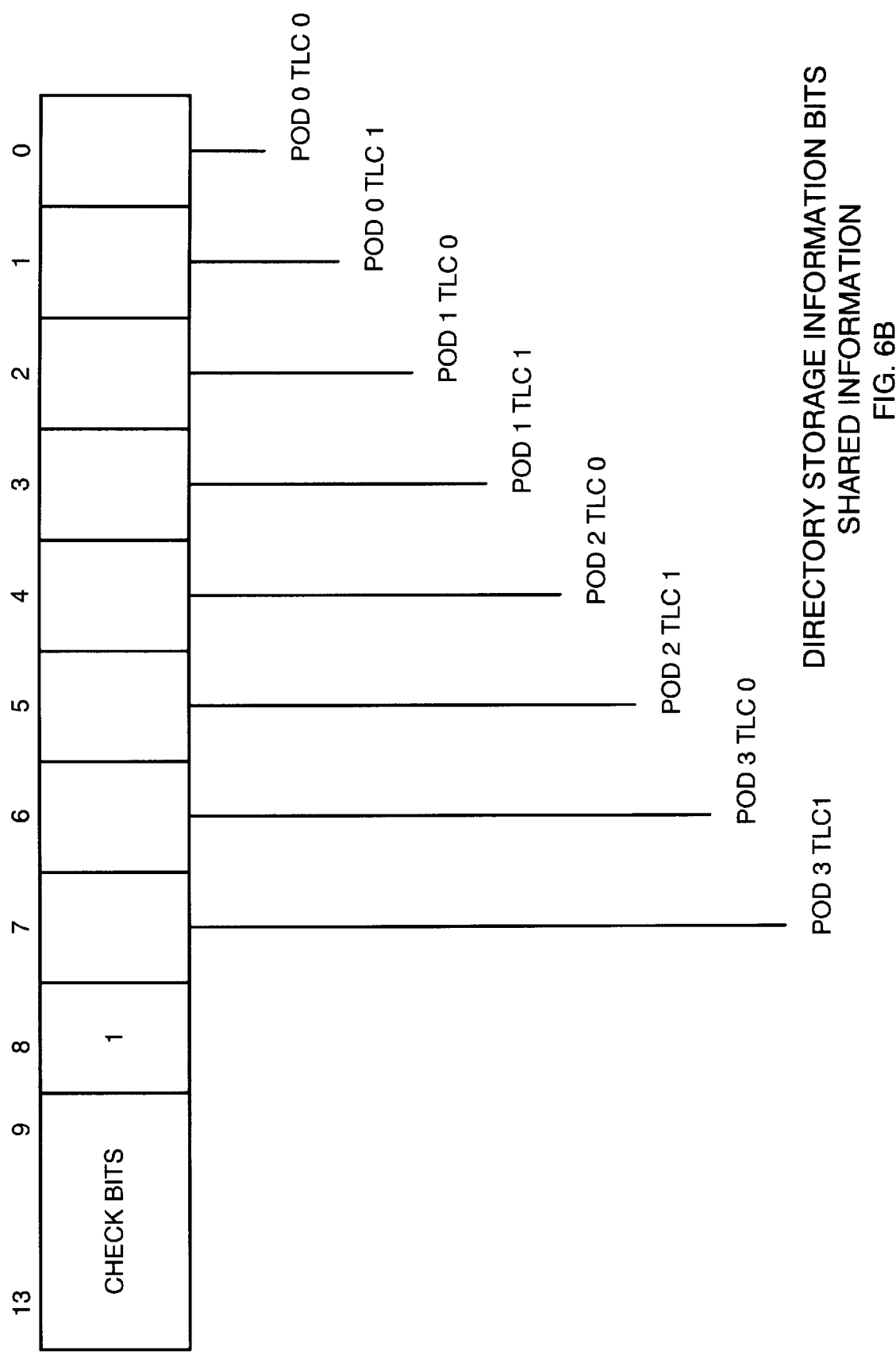

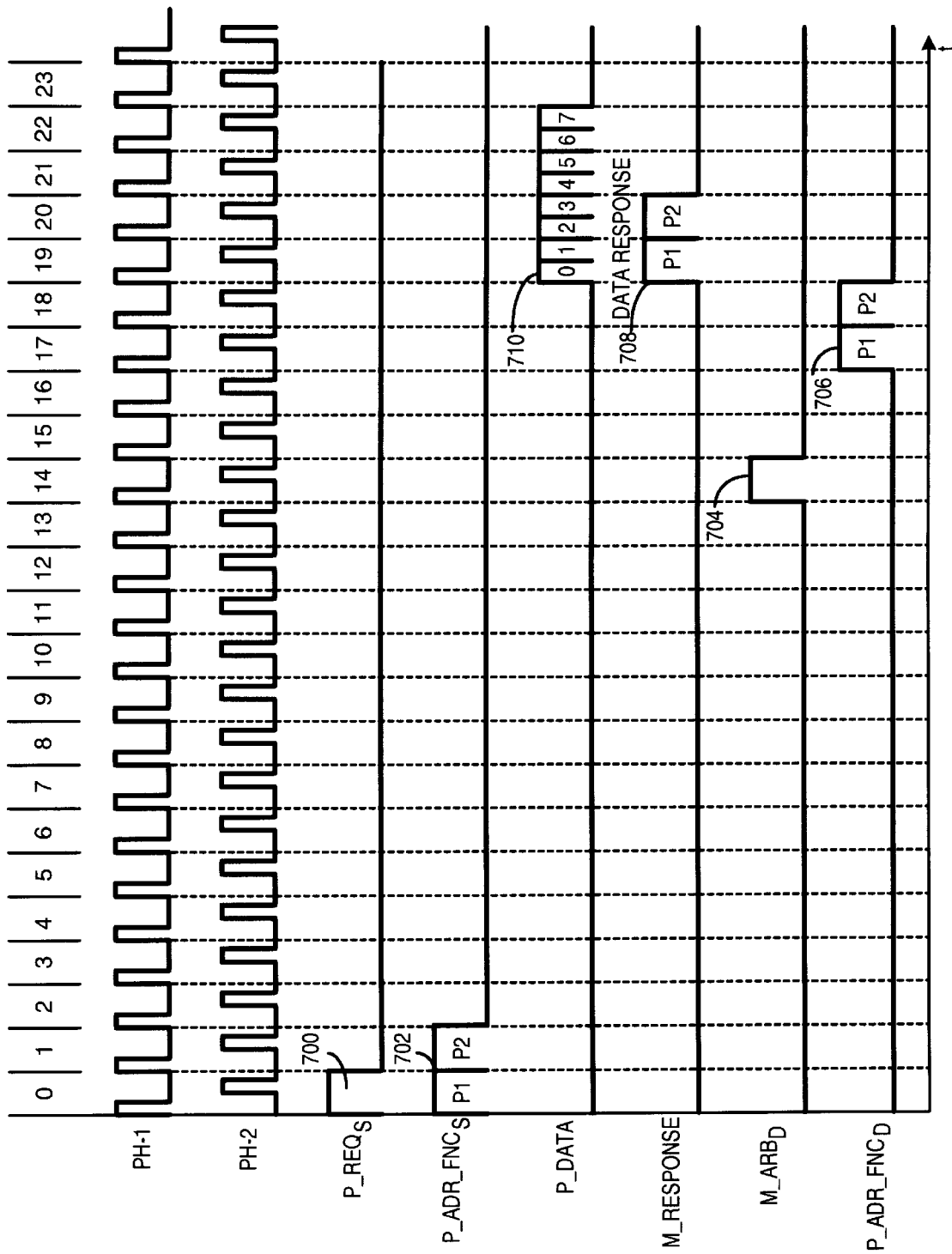
FIG. 7 - PRIOR ART

SYSTEM AND METHOD FOR INCREASING DATA TRANSFER THROUGHPUT FOR CACHE PURGE TRANSACTIONS USING MULTIPLE DATA RESPONSE INDICATORS TO MAINTAIN PROCESSOR CONSISTENCY

CROSS-REFERENCE TO OTHER PATENT APPLICATIONS

The following co-pending patent application of common assignee contains some common disclosure:

"High-Performance Modular Memory System With Crossbar Connections"; Ser. No. 09/001,592, which is incorporated herein by reference in its entirety; and "Directory Based Cache Coherency System Supporting Multiple Instruction Processor and Input/Output Caches"; Ser. No. 09/001,598, which is incorporated herein by reference in its entirety.

FIELD OF THE INVENTION

This invention relates generally to processor consistency schemes for use in multiprocessing, shared memory systems, and more particularly to a system and method for decreasing the latencies associated with maintaining processor consistency by providing multiple response protocols for allowing parallel activity while maintaining processor consistency.

BACKGROUND OF THE INVENTION

Large-scale data processing systems typically utilize a tremendous amount of memory. This is particularly true in multiprocessing systems where multiple processing units and numerous input/output modules are implemented. There are several memory methodologies known in the art that provide for efficient use of memory in such multiprocessing environments. One such memory methodology is a distributed memory where each processor has access to its own dedicated memory, and access to another processor's memory involves sending messages via an inter-processor network. While distributed memory structures avoid problems of contention for memory and can be implemented relatively inexpensively, it is usually slower than other memory methodologies, such as shared memory systems.

Shared memory is used in a parallel system, or multiprocessing, system, and can be accessed by more than one processor. The shared memory is connected to the multiple processing units—typically accomplished using a shared bus or network. Large-scale shared memories may be designed to cooperate with local cache memories associated with each processor in the system. Cache consistency protocols, or coherency protocols, ensure that one processor's locally-stored copy of a shared memory location is invalidated when another processor writes to that shared memory location.

More particularly, when multiple cache memories are coupled to a single main memory for the purpose of temporarily storing data signals, some system must be utilized to ensure that all processors, such as instruction processors (IPs) are working from the same (most recent) copy of the data. For example, if a copy of a data item is stored and subsequently modified in a cache memory, another IP requesting access to the same data item must be prevented from using the older copy of the data item stored either in main memory or the requesting IP's cache. This is referred to as maintaining "cache coherency." Maintaining cache coherency becomes more difficult as more caches are added to the system since more copies of a single data item may have to be tracked.

For distributed systems having hierarchical memory structures, a cache directory is a practical manner of maintaining cache coherency. Directory-based coherency systems utilize a centralized directory to record the location and the status of data as it exists throughout the system. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory.

Along with IP caching, it is also desirable to allow input/output (I/O) units to maintain copies of memory data for either read or read/write purposes. This becomes particularly important as the number of input/output (I/O) units in the system increases. This localized I/O storage may be accomplished by coupling one or more of the I/O units to shared I/O cache memories or other I/O buffers.

In addition to maintaining cache coherency, multiprocessing systems such as Symmetrical Multi-Processor (SMP) systems require "processor consistency." This means that all processors of the multiprocessor system, including I/O processors, processing module processors such as instruction processors and the like, collectively observe modifications to storage locations in the same order that they were modified by individual processors. For example, assume two processors referencing storage locations L1 and L2. A first processor, Processor A, first writes to location L1 and then to location L2. Assume that a second processor, Processor B, wants to read location L2 followed by location L1. If Processor B were to recognize that the information in location L2 was newly updated by Processor A, then Processor B would know that L1 would also obtain new data since it was written by Processor A prior to L2 being written by Processor A. An application of this consistency rule can be realized by implementing memory locking mechanisms. That is, if an updated copy of data exists within a local cache, other processors are prohibited from obtaining a copy of the data from main memory until the updated copy is returned to main memory, thereby releasing the lock. More specifically, Processor A will change a data structure in location L1, and set a lock cell in location L2. Processor B will first read the lock cell in location L2 to determine whether there is new data available in location L1. If Processor B recognizes that a lock cell is set, it knows that the new data structure in location L1 is present and will thereafter make reference to it. Until then, it is "locked out" in order to avoid the situation where Processor B obtains any invalid data.

Such a consistency rule becomes increasingly difficult to apply in systems having multiple caches and multiple data paths. For example, in a cache-based system, location L1 could currently reside in Processor B's cache. Processor A, which wants to update the data at location L1 currently owned by Processor B, will typically cause a memory controller to "invalidate" the data at location L1 in Processor B's cache and cause the valid data in Processor B's cache to be returned to a main storage area. Processor A thereafter might deliver a new value to the main storage area for location L2. However, this new value can potentially be immediately read by Processor B before the invalidate signal reaches Processor B. In such an instance, Processor B would recognize a new value at location L2, but would erroneously read its own cache to obtain the data at L1 since the invalidate signal had not yet reached Processor B. In other words, "invalidate" traffic and "data delivery" traffic do not necessarily travel the same paths within the system, and therefore could encounter different delays as they flow to their destination due through different data paths, queuing structures, and the like. Such a condition may cause a violation of the consistency rule required to maintain processor consistency.

One manner of managing such a processor consistency quandary in a directory-based cache coherency scheme is to delay the data delivery from a targeted location until all of the associated coherency functions for that particular cache line have been sent. This, however, results in undesirable latencies that adversely affect overall system performance. It would therefore be desirable to provide a system and method for providing processor consistency between processors in a multiprocessing, multi-cached system without experiencing undesirable time delays where one processor requires data owned by another processor. The present invention provides a solution to the shortcomings of the prior art, and offers numerous advantages over existing processor coherency methodologies.

SUMMARY OF THE INVENTION

The present invention relates generally to a system and method for decreasing the latencies associated with maintaining processor consistency by providing multiple response protocols for allowing parallel activity while maintaining processor consistency.

In accordance with one embodiment of the invention, a method is provided for reducing data transfer delays in a transaction processing system which includes a plurality of devices each having an associated local memory, and a supervisory memory module having a main storage module for storing data segments and a directory storage for maintaining ownership status of each data segment stored in the main storage module and the local memories. The invention is particularly beneficial where a first device which is storing a copy of a data segment in a first local memory, where the data segment is requested by a second device. The method includes transferring a data transfer request for the requested data segment from the second device to the supervisory memory module, where the data transfer request includes an identifier requesting permission to modify the requested data segment. The requested data and a data transfer response is delivered to the second device upon receipt of the data transfer request, where the data transfer response provides modification privileges of the requested data segment to the second device. A purge command is issued to the first device to invalidate the copy of the requested data segment in the first local memory. Upon issuance of the purge command to the first device, a purge acknowledge response is delivered to the second device, where the purge acknowledge response provides an indication that the copy of the requested data in the first local memory has been invalidated. In a more particular embodiment of the invention, the second device is prohibited from releasing any modified data until the purge acknowledge response is received.

In accordance with another embodiment of the invention, a system for maintaining processor consistency in a transaction processing system is provided. The system includes a plurality of devices each having an associated local memory, wherein a first device includes a first local memory storing a copy of a requested data segment subject to a first data fetch request by a second device, and wherein the first device or any device other than the second device subsequently initiates a second data fetch request for the requested data segment. The system includes a supervisory memory module, which in turn includes a directory storage and a data storage module. The directory storage is used to maintain ownership status of the requested data segment, where the ownership status reflects that the first device has a copy of the requested data segment. The data storage module includes a main storage module to store data segments, to deliver the requested data segment and a data transfer response to the second device in response to the first data fetch request, and to issue a purge command to the first device to direct the first device to invalidate its copy of the requested data segment. The second device is allowed to modify the requested data segment in response to the data transfer response, and is prohibited from releasing the modified data segment from the second device until receipt of the purge command by the first device is acknowledged. A content addressable memory (CAM) is provided to store the second data fetch request prior to its release to the supervisory memory module. Upon delivery of the purge command to the first device, the supervisory memory module issues a purge acknowledge command to allow the release of the modified data segment from the second device, and to allow the second data fetch request to be released from the CAM to the supervisory memory module.

In accordance with another embodiment of the invention, a method is provided for reducing data transfer delays in a transaction processing system. The transaction processing system includes a plurality of devices having associated local memories, and a supervisory memory module having a main storage module for storing data segments and a directory storage for maintaining ownership status of each data segment stored in the main storage module and the local memories, and wherein a first one of the devices includes a first local memory storing a copy of a data segment requested by a second one of the devices. The method includes requesting possession and ownership of a requested data segment by way of a data fetch request from the second device. The requested data segment is delivered from the supervisory memory module to the second device in response to the data fetch request. The second device is granted ownership privileges, including data segment modification privileges to create a modified data segment. A data purge request is provided to the first device to direct the first device to invalidate its copy of the requested data segment, wherein the data purge request is unable to arrive at the first device prior to the delivery of the requested data to the second device. A purge acknowledge indication is provided to the second device upon delivery of the data purge request to the first device. The second device is permitted to return the modified data segment to the supervisory memory module upon receipt of the purge acknowledge indication.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

FIGS. 6A and 6B illustrate one embodiment of Directory Storage Information Bit formats used to encode the directory states;

FIG. 7 is a timing diagram illustrating a prior art method of maintaining processor consistency in a multiprocessing system;

DETAILED DESCRIPTION OF THE ILLUSTRATED EMBODIMENTS

While the present invention is particularly advantageous in the context of a Symmetrical Multi-Processor (SMP) environment as described below, it will be appreciated by those skilled in the art that the invention may be equally applicable to other computing environments requiring management of cache coherency. Further, the example computing environment described below includes a description of a directory-based cache coherency system within which the present invention is particularly useful. Therefore, the SMP environment and related cache coherency system described in FIGS. 1–6B below is provided for illustrative purposes and to provide a context from which a full operational understanding of the present invention may be obtained; however the invention is not limited thereto.

Figure 1:
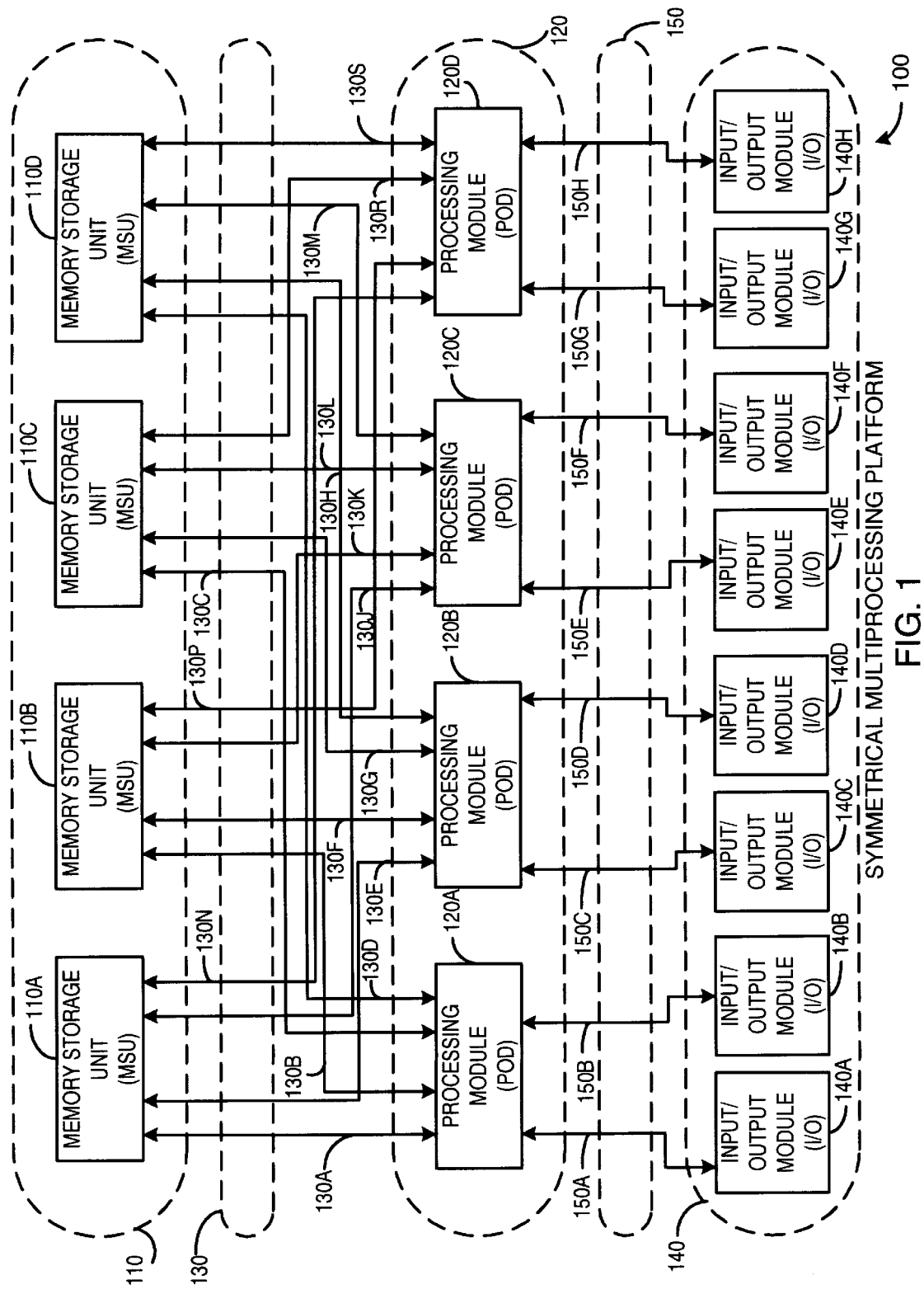
FIG. 1 is a block diagram of a Symmetrical Multi-Processor (SMP) System Platform in which the principles of the present invention may be applied.

FIG. 1 is a block diagram of a Symmetrical Multi-Processor (SMP) System Platform in which the principles of the present invention may be applied. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In this example SMP environment, MI 130 comprises separate bi-directional data and bi-directional address/command interconnections, and further includes unidirectional control lines that control the operation on the data and address/command interconnections (not individually shown). The control lines operate at a system clock frequency (SYSCLK) while the data bus runs source synchronous at two times the system clock frequency (2× SYSCLK). For example, in one embodiment, the system clock frequency is approximately 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but may have a transfer rate that is approximately half the transfer rate of the MI Interfaces because the I/O Modules 140 are located at a greater distance from the PODs 120 than are the MSUs 110 and produce different timing considerations.

Figure 2:
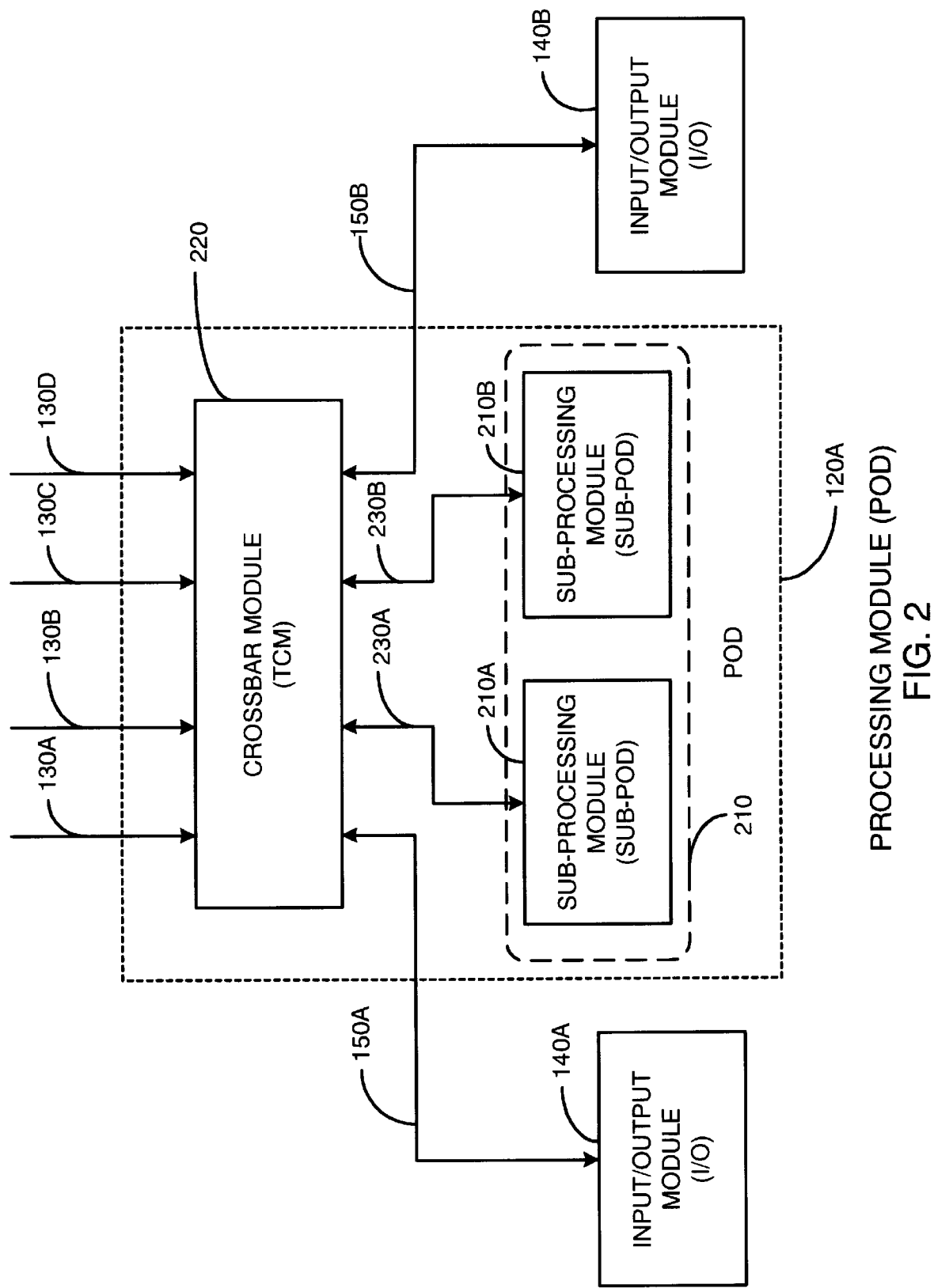
FIG. 2 is a block diagram of one embodiment of a processing module (POD)

FIG. 2 is a block diagram of one embodiment of a processing module (POD). POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MI interconnections 130. TCM 220 further interconnects to one or more I/O Modules 140 via the respective point-to-point MIO Interfaces 150. TCM 220 buffers data, and functions as a switch between Interfaces 230A, 230B, 150A, and 150B, and MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. The TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems. In one embodiment of the SMP environment, I/O Modules 140 are external to Sub-POD 210 as shown in FIG. 2. This embodiment allows system platform 100 to be configured based on the number of I/O devices used in a particular application. In another configuration, one or more I/O Modules 140 are incorporated into Sub-POD 210.

Figure 3:
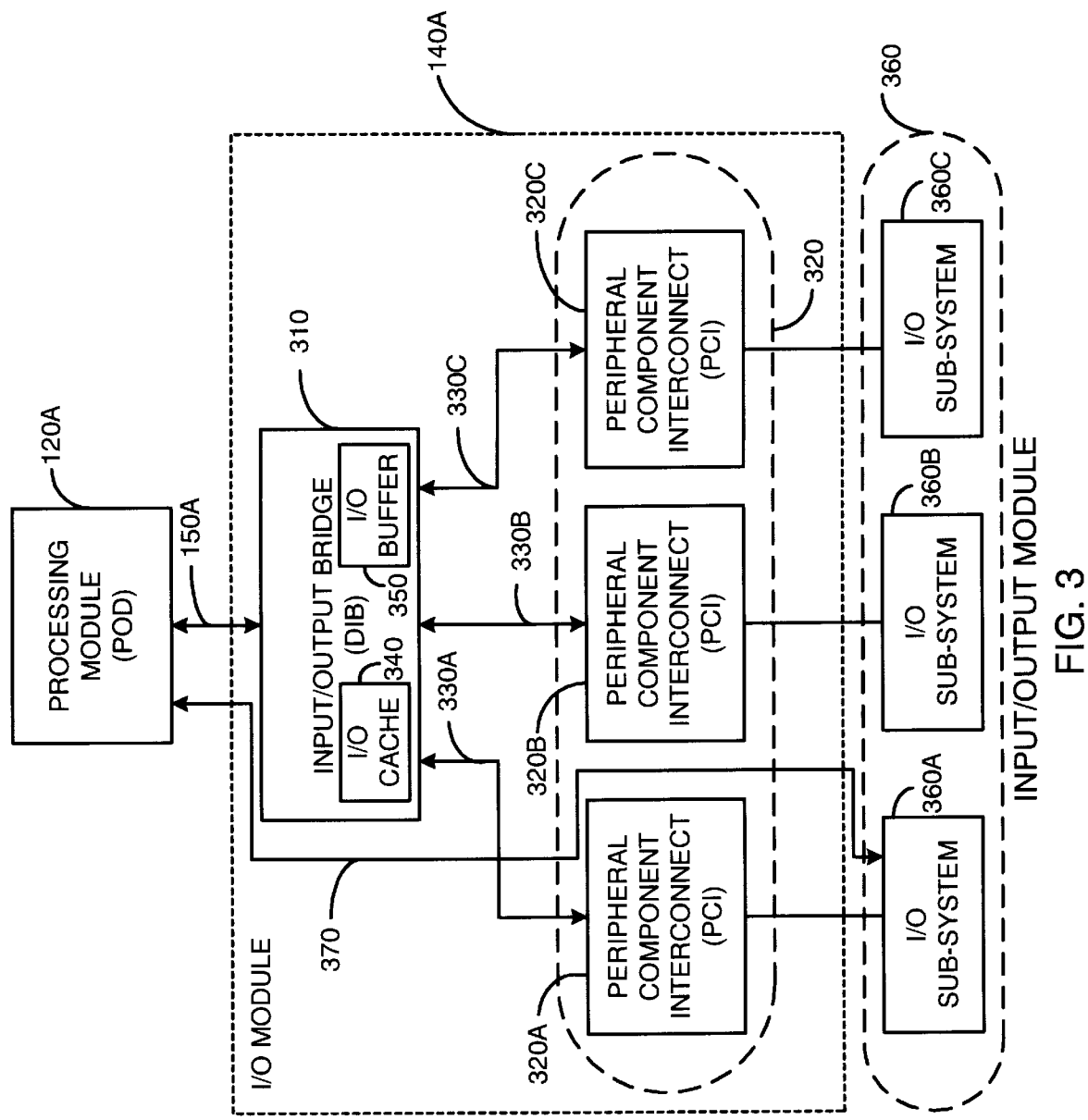
FIG. 3 is a block diagram of an I/O Module used in connection with an SMP system.

FIG. 3 is a block diagram of an I/O Module used in connection with the exemplary SMP system. I/O Module 140A and Processing Module 120A are illustrated, but it is understood that each I/O Module 140 has a similar structure and interconnection. I/O Module 140A includes a Direct Input/Output Bridge (DIB) 310 connected to one or more Peripheral Component Interconnects (PCIs) in dashed block 320, individually shown as PCI 320A, PCI 320B, and PCI 320C, via one or more dedicated PCI Interfaces 330, shown individually as PCI Interfaces 330A, 330B, and 330C, respectively. DIB 310 is also connected to POD 120A via MIO Interface 150A as is shown in FIG. 2. DIB 310 buffers data, and functions as a switch between PCI Interfaces 330A, 330B, and 330C and MIO Interface 150A, allowing POD 120A access to each of PCIs 320A, 320B, and 320C, respectively. The DIB includes I/O Cache 340 coupled to each of the PCIs in the associated DIB, and is used to buffer read-only data received from an MSU 110 for use by one or more of the various I/O devices associated with the PCIs. The DIB further include an I/O Buffer 350 used to buffer read/write data retrieved from an MSU 110 for the purposes of performing partial write operations. Together, I/O Cache 340 and I/O Buffer 350 may be referred to as I/O Memories. The functionality provided by these I/O memories will be described in more detail below.

Peripheral Component Interconnect (PCI) 320 represents a set of industry-standard PCI add-in cards, each of which connects multiple I/O Sub-systems in dashed block 360, individually shown as I/O Sub-systems 360A, 360B, and 360C, to I/O Module 140A via an industry-standard bus. These I/O Sub-systems 360 include, but are not limited to, SCSI controllers, LAN controllers, and video controllers, and various other disk and tape sub-systems. Other I/O bussing architectures could similarly be used in connection with the SMP environment, and the particular I/O bussing architecture selected is not relevant to the present invention.

In operation, memory data can be retrieved from an MSU 110, and transferred via MIO Interface 150A to an I/O Sub-system 360 such as a tape or disk sub-unit so that a copy may be created. In this instance, it is not necessary to store the memory data in either the I/O Cache 340 or the I/O Buffer 350 as is indicated by Line 370.

Memory data may also be retrieved from an MSU 110 to be stored in I/O Cache 340. Data within I/O Cache 340 is available to the I/O Sub-units 360 through the associated PCIs 320 for read-only purposes. The I/O Cache reduces system overhead by reducing the number of read requests that must be presented to an MSU.

As stated above, one embodiment of the I/O Cache involves storing the data in the I/O Cache for read purposes only. When data is transferred from an I/O Module to be written to an MSU, one of two methods is utilized. When an entire contiguous block of data is to be written by an I/O Module to an MSU 110, the I/O Module performs an Overwrite operation. The contiguous data block is transferred from an I/O Sub-system such as disk directly to the MSU without being temporarily stored within an I/O Cache 340 or I/O Buffer 350 as is indicated by Line 370. The data provided by the I/O Module will overwrite whatever data signals previously were stored within the MSU. In other instances, the I/O Module is not overwriting an entire contiguous block of memory data but is instead merging data retrieved from an I/O Sub-system into selected addressable portions of a memory block. In these situations, an addressable block of memory data is copied from an MSU 110 to I/O Buffer 350. Data is then retrieved from I/O Sub-system 360 and selectively merged into I/O Buffer 350, and the entire addressable block of memory data is transferred back to the appropriate MSU. This is done so that an MSU is not forced to handle the merging process, which would diminish data throughput. One manner in which these various I/O operations are supported by the cache coherency system of the example memory system is discussed below.

Figure 4:
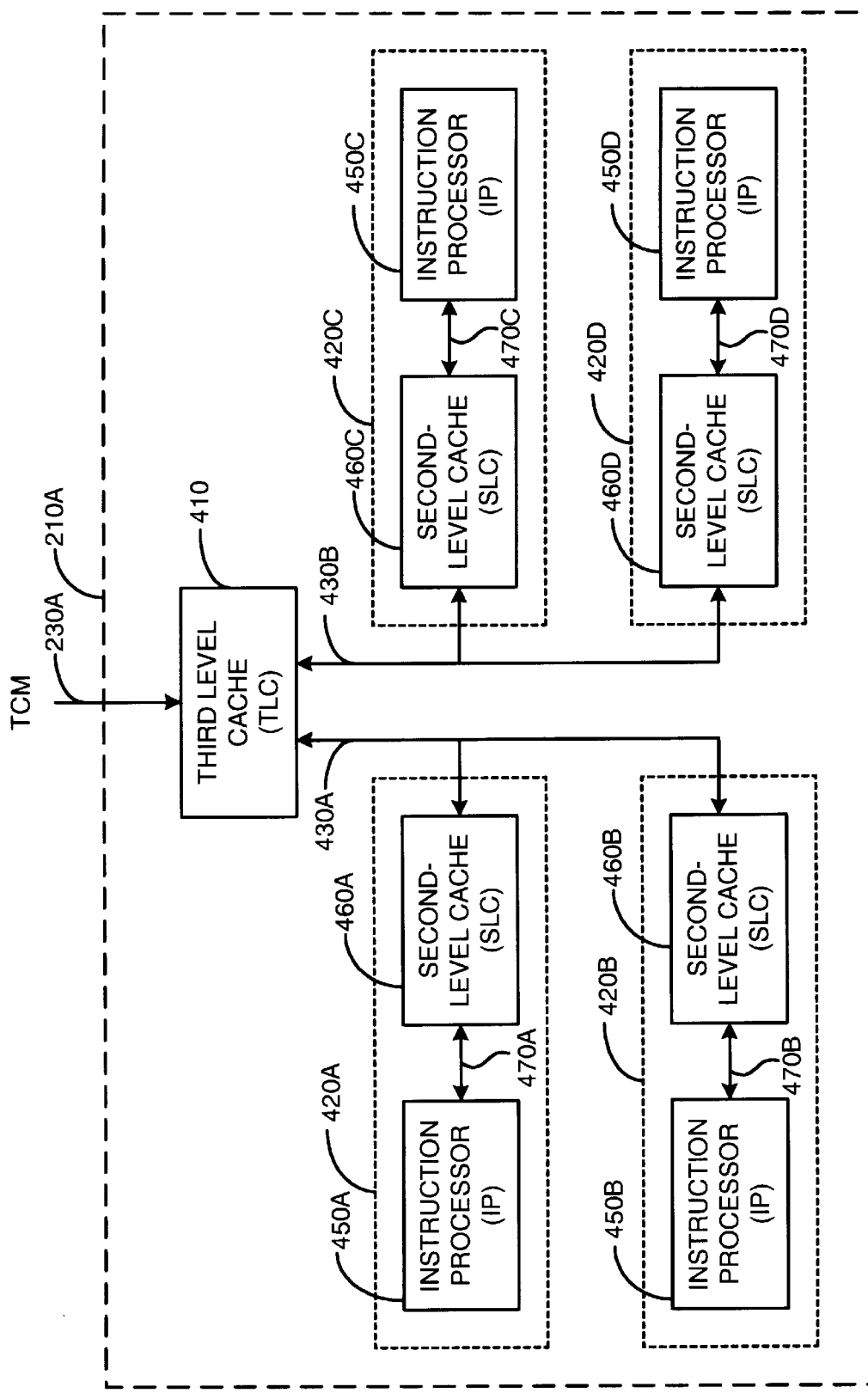
FIG. 4 is a block diagram of one example of a Sub-Processing Module (Sub-POD)

FIG. 4 is a block diagram of one example of a Sub-Processing Module (Sub-POD) 210A. Sub-POD 210A is shown, but it is understood that all Sub-PODs 210 have similar structures and interconnections. In this embodiment, Sub-POD 210A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B.) For example, SLC 460A interfaces to IP 450A via Interface 470A and to TLC 410 via Bus 430A. Similarly, SLC 460C interfaces to IP 450C via Interface 470C and to TLC 410 via Bus 430B. Each SLC caches data from the TLC as requested by the interconnecting IP 450.

IP 450 and SLC 460 may be integrated in a single device, such as in a Pentium Pro® Processing device available from the Intel Corporation. Alternatively, the IP 450 may be a A-Series Instruction Processor or a 2200-Series Instruction Processor, both commercially available from the Unisys Corporation. In this embodiment, the IP 450 is externally coupled to an SLC 460. Further, each IP 450 may include multiple First-Level Caches (FLC), and in one embodiment includes an FLC for instructions and another FLC for data.

Figure 5:
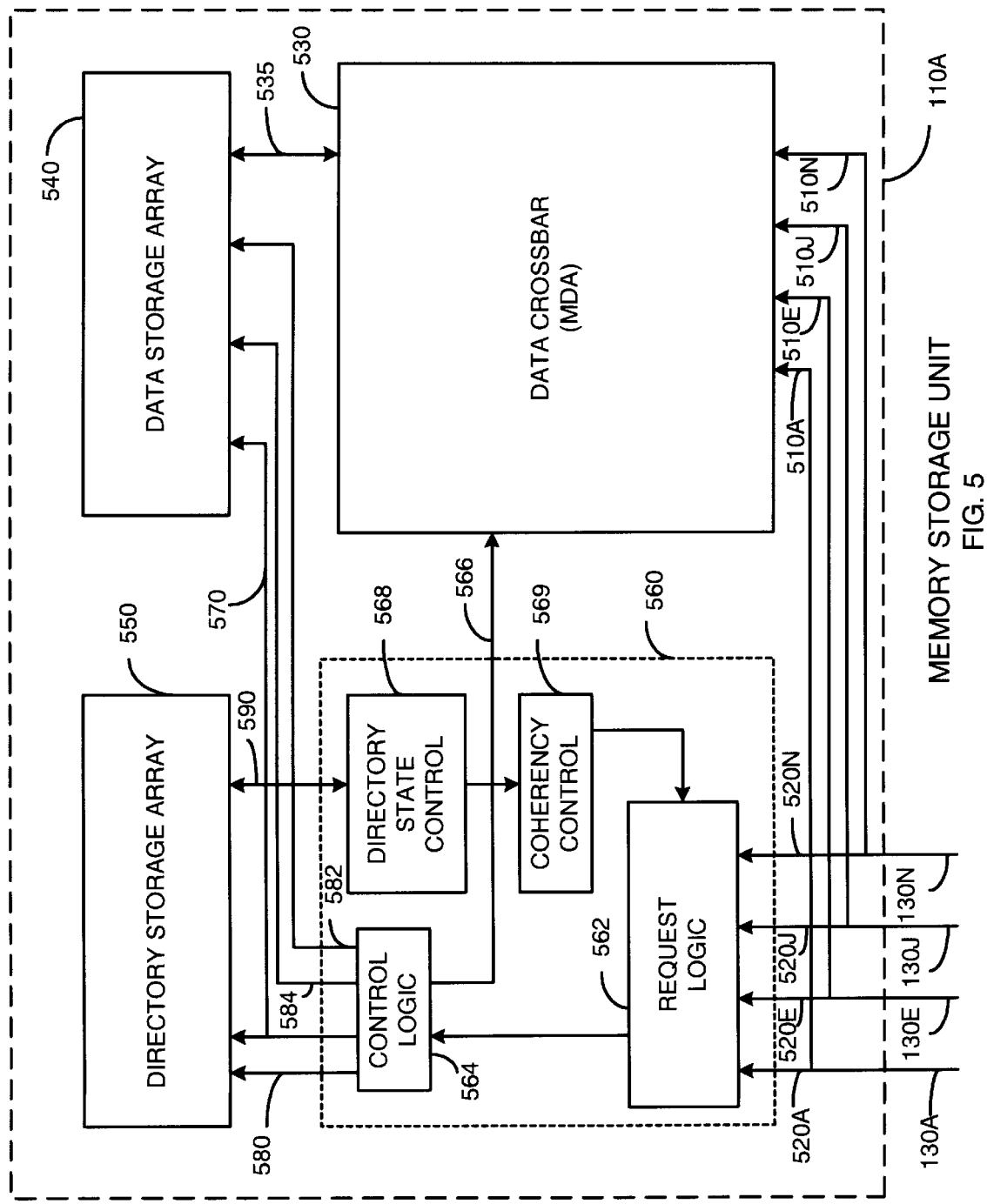
FIG. 5 is a block diagram of a Memory Storage Unit (MSU)

FIG. 5 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N) wherein each set of Data Lines 510 includes sixty-four bi-directional data bits, data parity bits, data strobe lines, and error signals (not individually shown.) Each set of Data Lines 510 is therefore capable of transferring eight bytes of data at one time. In one embodiment, a memory transfer operation involves eight eight-byte transfer operations over a respective set of Data Lines 510. Thus any transfer operation involves 64 bytes, which is termed one "cache line" of data.

Data Lines 510A, 510E, 510J, and 510N interface to the Memory Data Crossbar (MDA) 530. The MDA 530 buffers data received on Data Lines 510, and provides the switching mechanism that routes this data between the PODs 120 and an addressed location within the Data Storage Array 540 via Line 535. Data Storage Array 540, which is addressed in 64-byte cache lines discussed above, provides the main storage facility for SMP 100. For each of the cache lines stored in the Data Storage Array, associated status bits are stored in the Directory Storage Array 550. The status bits, referred to as the "Directory Storage Information Bits", identifies which device is the current owner of the corresponding cache line, and which IP(s) 450 or which IOP 140 has a copy of the associated cache line stored within a local cache memory. Whenever any read or write operation is performed to a cache line within the Data Storage Array 540, the Directory Storage Information Bits associated with that cache line are read from the Directory Storage Array 550.

These bits are used to determine how the read or write operation should be processed. For example, these bits may indicate that the Data Storage Array may not contain the most recent copy of the requested cache line because a (possibly updated) copy of the cache line resides in a specified TLC 410. The memory operation will therefore be completed by retrieving this copy from the TLC, forcing the TLC to designate the copy as unusable (invalidate it), and providing the copy to the new requester. The Directory Storage Information Bits will be updated to reflect the newly created copy of the cache line.

Control for MSU 110A is provided by the Memory Controller (MCA) 560. MCA includes Request Logic 562 for queuing requests and associated commands from Address/command Lines 520 (shown as 520A, 520E, 520J, and 520N.) The commands are provided by the PODs 120 on behalf of the TLCs 410 and I/O Caches 340 to indicate what type of memory operations are to be performed. The queued requests and the associated commands are provided to Control Logic 564, which generates the routing control information for MDA 530 on Line 566. This control information essentially synchronizes the data and corresponding addresses as they migrate from the POD interface to the Data Storage Array 540. Control Logic 564 provides address signals to Directory Storage Array 550 and Data Storage Array 540 on Lines 570. Control signals are provided to Directory Storage Array 550 and Data Storage Array 540 on Lines 580 and 582, respectively. Control Logic 564 further provides Mask Signal 584 to Data Storage Array 540 to control which data signals transferred on Line 535 to the Data Storage Array are actually written to the Data Storage Array, as will be discussed further below.

MCA 560 further includes Directory State Control 568. During any read or write operation of a cache line stored in Data Storage Array 540, Directory State Control 568 retrieves the associated Directory State Information from the Directory Storage Array 550 across Lines 590. Directory State Control 568 then updates the Directory State Information based on the command associated with the memory request, and further based on the identity of the requesting unit. After this update is performed, the information is written back to the Directory Storage Array.

MCA 560 also includes Coherency Control 569. Coherency Control receives Directory Storage Information from Directory State Control 568. In response to this status information, Coherency Control generates control signals to the Request Logic 562 causing Request Logic to issue Functions to one or more the PODs so that the in-progress memory operation may be completed in a manner which guarantees cache coherency. Using the example provided above, assume the Directory Storage Information Bits associated with the requested cache line indicate that the most recent copy of a requested cache line is located in a specified one of the TLCs. Coherency Control 569 receives this information from Directory State Control 568 and generates control signals to Request Logic 562. Request Logic issues the appropriate Function to the POD associated with the specified TLC, thereby causing the TLC to return the requested cache line in a manner to be described below.

Data coherency involves ensuring that each POD 120 operates on the latest copy of the data. Since multiple copies of the same data may exist within platform memory, including the copy in the MSU and additional copies in various I/O Caches 340 or Third Level Caches 410, some scheme is needed to control which data copy is considered the "latest" copy. In the computing environment of the present example, a directory protocol is used to maintain data coherency. The directory protocol of this embodiment stores Directory Storage Information Bits for each of the cache lines stored in an MSU 110. This information is monitored and updated by the MCA 560 when a cache line is read or modified. The Directory Storage Information Bits includes information that indicates which "state" a cache line is in, and further indicates which TLC(s) or I/O Cache may have a copy of the cache line.

A cache line "state" provides information about what access privileges are associated with the cache line, and further indicates which actions need to be taken by the MSU and the rest of Platform 100 before a request concerning a particular cache line may be granted. For example, the cache line data may have to be retrieved from one of the TLC or I/O Caches. In other cases, copies of the cache line may have to be invalidated within one or more TLC or I/O Caches before the MSU can provide the request cache line to the requester.

In the exemplary system described above, a cache line is in one of the following states, including "MSU Owns", "Exclusive", "Shared", "I/O Copy", "I/O Exclusive", "Deferred", and "Error". All cache lines in the MSU are placed in the "MSU Owns" state after system initialization and before any cache lines have been copied into one of the system caches. This is also the state a cache line enters after it is overwritten with new data received from an I/O subsystem such as disk or tape during an "Overwrite" operation. This state indicates that the MSU has the most recent copy of the cache line. Since only the MSU is considered to have a valid copy of any cache line that is in the MSU Owns state, an error occurs if any of the TLCs or I/O Caches attempts to write to the cache line at this time.

A POD may make a request to an MSU to obtain ownership to modify a copy of a cache line. This request is made on behalf of a TLC 410 associated with that POD. When the TLC is provided with the requested cache line, the cache line transitions to the "Exclusive" state. The TLC receiving the cache line is said to be the "Owner" of that cache line, and has read/write access rights. Only one cache may be the Owner of a cache line at once. No other cache may have a copy of the cache line while another cache is the Owner. Once the cache line enters the Exclusive state, the copy of the cache line stored within the MSU is no longer considered valid. When the MSU receives requests for a cache line that is in the Exclusive State, the MSU must retrieve the cache line copy from the Owner during what is referred to as a "Return" operation.

A POD may also request a copy of a cache line for read-only purposes. When a cache line is copied to one of the TLCs for read-only purposes, the cache line state transitions to the "Shared" state. When in this state, the cache line may reside within one, several, or all of the TLCs 410 in Platform 100 at once. The MSU is still considered to have a valid copy of the cache, and may provide this cache line to a TLC making a further read-only request.

Another read-only state is the "I/O Copy" state. In the I/O Copy state, the cache line may reside within one I/O Cache 340 and no TLCs. As is the case with the Shared state, the MSU is still considered to have a valid copy of the cache line, and modifications may not occur to the cache line within the I/O Cache. The coherency actions employed when a cache line is in this state are similar to those used when the cache line is in the Shared state. This state is used to provide multiple I/O Sub-systems 360 coupled to I/O Cache 340 with access to MSU data for read-only purposes, thereby reducing the number of requests made to main memory, and I/O-to-memory access times.

The "I/O Exclusive" state allows an I/O Buffer 350 to gain an exclusive copy of the cache line with read/write access rights, thereby becoming the cache line Owner. When the cache line is in this state, no other copies may exist within any other cache in the system. Moreover, the Owner is not forced to return the cache line until it has completed the operation. That is, the MSU does not initiate the return of cache lines in this state as a result of subsequent requests by other units. Instead, the Owner returns the cache line on its own accord. This allows an I/O unit to receive a cache line from the MSU, selectively merge received from a disk or tape sub-system into the cache line, then write the cache line back to main memory after all updates are completed without an MSU performing any coherency operations. This allows system overhead to be reduced in a manner to be described below.

A cache line may also be in the "Deferred" state, indicating that the cache line state is in transition. The Deferred state is entered when a request is made for a cache line that is either in the Exclusive or I/O Exclusive state. Since the MSU is not considered to have a valid copy of a cache line that is in either the Exclusive or I/O Exclusive states, the request is deferred until the Owner of the cache line returns access rights and/or the modified copy of the cache line to the MSU. Once the MSU issues a Function to the current Owner initiating the return of the cache line, the cache line must transition to this temporary state. Otherwise, the MSU will (erroneously) issue additional Functions to the current Owner if subsequent requests for this cache line are received before the return of the cache line is completed.

Finally, a cache line may also transition to the "Error" state. A cache line transitions to the Error state when the MSU receives an unexpected command. For example, if a cache line is in the MSU Owns state, the MSU should contain the only valid copy of the cache line within the Platform. Therefore, a command attempting to write the cache line from a cache to the MSU is considered an illegal and unexpected operation, and will cause the cache line to transition to the Error state. Once a cache line is in the Error state, it may not be accessed. It remains in the Error state until the MSU is re-initialized, or until an I/O Module 140 makes a request to write new data to the entire cache line during an I/O Overwrite operation.

Figure 6A:
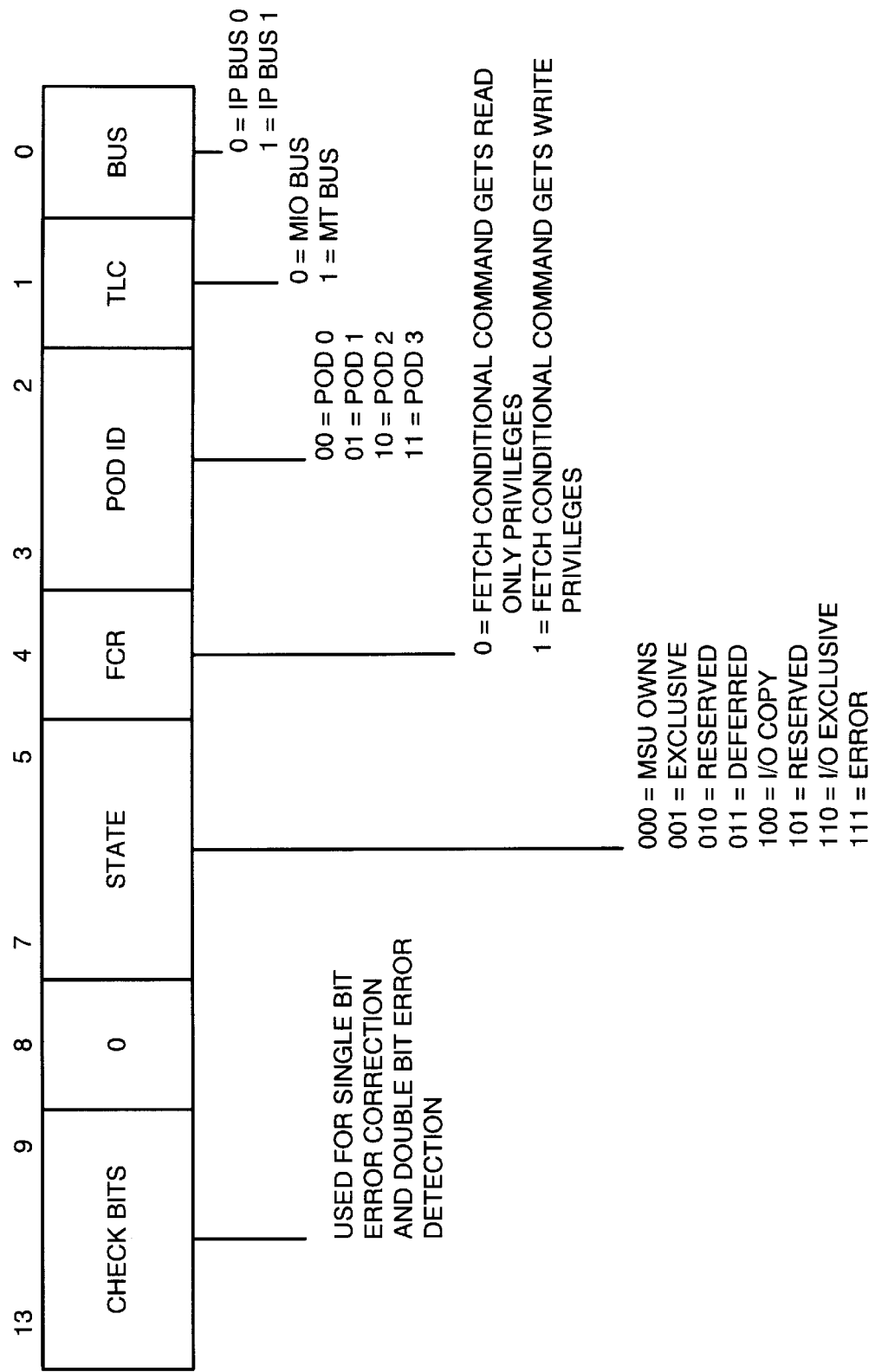

FIGS. 6A and 6B are Directory Storage Information Bit Formats used to encode the directory states described above. The Directory Storage Information Bits may be expressed in two formats. The Ownership Format, which is designated by setting Bit 8 to 0, is shown in FIG. 6A. This format is used whenever a cache line is in any other state other than the Shared State. When described in Ownership Format, the cache line state is encoded in bits 7–5. Bits 3–0 encode the identity of a TLC or I/O Cache having a copy of the cache line. More specifically, bits 3–2 identify the POD associated with the cache. Bit 1 indicates whether the cache is coupled to a MIO Interface 150 (I/O Cache) or a MT Interface 230 (TLC). Finally, bit 0 identifies the cache as one of the two TLCs 410 or I/O Caches 340 associated with a given POD.

FIG. 6B is the format used to express Directory Storage Information Bits when the associated cache line is in the Shared State. This format, which is designated by setting bit 8 to one, identifies one or more TLC(s) having a shared copy of the cache line using a vector stored in bits 7–0.

In both the Ownership and Shared Formats illustrated in FIGS. 6A and 6B respectively, bits 13–9 store the check bits that provide single bit error correction and double-bit error detection on bits 8–0 of the Directory Storage Information Bits.

As discussed above, when a POD 120 makes a read request to an MSU 110 for a cache line, the MCA will read the associated Directory Storage Information Bits, update them according to the request, and write them back to the Directory Storage Array 550. The new state of the cache line depends both on the type of request, and the identity of the cache which will obtain a copy of the cache line. The type of request is determined by the "command" provided by the requesting POD 120 on predetermined Address/command Lines 520. The identity of the requesting cache is encoded on other Address/command Lines using an encoding scheme similar to that used within the Directory Storage Information Bits. As discussed above, when the MSU receives a command from one of the PODs, the MSU may respond by issuing a Function to one or more of the PODs to cause some action to occur with respect to the cache line so that cache line coherency will be maintained.

It should be noted that in one embodiment of the aforementioned SMP system, the PODs do not initiate the requests of their own accord. Each command is issued by a POD because of a request made by an associated TLC or an I/O Cache. Furthermore, although functions are said to be issued by the MSU to a POD, it should be understood that each of these functions are issued to solicit an action within a TLC or an I/O Cache associated with the POD. In other words, logic within the POD facilitates communications functions occurring between the MSU and the TLC and I/O Caches associated with the POD.

A POD issues five types of Commands to the MSU: Fetches, Stores, I/O Commands, Special Commands, and Diagnostic Commands. Fetches generally request that data from the MSU be provided to a TLC. Stores indicate that data and/or access rights are being returned to the MSU by a TLC. I/O Commands include Commands which are counterparts to the Fetches and Stores, but which request that a cache line be transferred from, or provided to, an I/O Cache. Diagnostic Commands are used to inject faults, and to perform verification functions. Special Commands include commands to send a message from one POD to another.

Further, an MSU may have to obtain the latest copy of a cache line before a request may be granted. To obtain this latest copy, the MSU issues return-type functions including the Return-Copy, Return-Purge, and Return-Purge-No-Data Functions. These return-type functions cause a TLC to return cache line data and/or permission rights to the MSU. Then the TLC responds to these functions, the data and/or permission rights are returned by the associated POD along with one of the Return Commands. Similarly, a POD issues an I/O Command when an I/O Module wants to read from, or write to, a cache line within an MSU 110.

The specific format and definition of general POD commands, I/O commands, and MSU return commands need not be fully described to understand the present invention, and therefore will not be described in full detail here. However, to obtain an appreciation of how such commands and return commands are encoded and issued, reference can be made to copending U.S. patent application, Ser. No. 09/001,598 entitled "Directory Based Cache Coherency System Supporting Multiple Instruction Processor and Input/Output Caches", filed on Dec. 31, 1997, which, as previously indicated, is incorporated herein by reference.

The aforementioned description of a cache coherency scheme used in connection with a directory-based memory system sets forth a computer memory environment in which the present invention is applicable. The following description of the present invention is described in terms of the above-described memory system for purposes of explanation and illustration. As will be apparent to those skilled in the art from the following description, the present invention is applicable in other environments and is not to be limited to the specific embodiment set forth above.

The present invention provides a mechanism for decreasing the latencies associated with maintaining processor consistency in multiprocessor systems using multiple local memories, such as the system previously described. The invention provides multiple responses to a requesting device in response to a data transfer request where a purge or return function would be required. The invention allows certain actions to be taken by the requesting device after receipt of the first response yet before receipt of the second response. Data processing activities are therefore allowed to occur in parallel, as the requesting device can perform certain data manipulation functions upon receipt of a first response, while the system concurrently performs required purge/return functions. In prior art systems, no data manipulation functions were allowed at the requesting device until the requested memory had been returned to the supervisory storage module and ownership rights had been transferred. Therefore, the present invention significantly reduces memory latency for data transfers between computing modules in cases where a requesting device seeks data currently owned by another device.

As previously described, systems such as an SMP system must maintain processor consistency such that all processors of the multiprocessor system observe modifications to storage locations in the same order that they were modified by the individual processors. Where a first of two processors, say Processor A, first writes to location L1 and then to location L2, and a second processor, Processor B, wants to read location L2 followed by location L1, Processor B must not read the data from these locations until Processor A has had the opportunity to fully update these data locations. In some prior art systems, this has been accomplished using memory locking mechanisms.

In systems having multiple caches and multiple data paths, the consistency rules become more complex. For example, in a cache-based system, location L1 could currently reside in Processor B's cache. Processor A, wanting to obtain and update the data at location L1 currently owned by Processor B, will typically cause a memory controller to "invalidate" the data at location L1 in Processor B's cache and cause the valid data in Processor B's cache to be returned to a main storage area. Processor A might also deliver a new value to the main storage area for location L2. However, this new value may be immediately accessible by Processor B before the invalidate signal reaches Processor B. In this case, Processor B would recognize a new value at location L2, but would erroneously read its own cache to obtain the data at L1 since the invalidate signal had not yet reached Processor B due to differing travel paths for the data and the invalidate signals. Therefore, the prior art has used intentional delays to ensure that all data has been modified before allowing the requesting processor to access any of the new data. While processor consistency can be maintained in this manner, it results in undesirable latencies that adversely affect system performance.

FIG. 7 is a timing diagram illustrating a prior art method of maintaining processor consistency in a multiprocessing system. In this prior art example, the data delivery from a storage location is delayed until all of the associated coherency functions for that cache line have been sent. Assume that Processor A issues a fetch request to obtain data from location L1 with the intention of modifying the data. In the example environment described above, this would be accomplished via Processor A's corresponding POD which activates the P_REQ$_S$ request pulse 700, and specifies the fetch command and address using address/function signal P_ADR_FNC$_S$ at pulse 702. In this example it requires two clock cycles (shown on phases 0, 1) to transfer the full command and address to the MSU. After reading its Directory Storage, the MSU determines that another requester (Processor B) has a copy of the data corresponding to location L1. Therefore, the MSU needs to send a "purge" function to Processor B for that location, so that Processor B does not attempt to utilize its locally-stored copy of the data. This is accomplished using the M_ARB$_D$ and P_ADR_FNC$_D$ signals illustrated by pulses 704 and 706 respectively. The M_ARB$_D$ signal is a request signal that arbitrates for the direction of the address bus such that the MSU can present the purge function and address location L1 to the POI) corresponding to Processor B. When the MSU is granted priority, which is accomplished in a distributed priority manner between the POD and MSU, the MSU transfers the function and address to the POD using signal P_ADR_FNC$_D$. After the invalidated address L1 is delivered to the POD corresponding to Processor B, the MSU then sends the data response shown on pulse 708 and data shown on pulse 710 to the requesting POD corresponding to requesting Processor A. The POD corresponding to Processor A would then be responsible for ensuring that a future response signal for L1 destined for Processor B would not reach Processor B prior to the pending invalidate signal for location L2 also destined for Processor B. Processor A would guarantee that modification of location L2 would not be visible to the system until it received and modified location L1. In this example, the POD associated with Processor A guarantees the order of delivery between responses to the same destination, and a new value at location L2 will be delivered to Processor B only after the invalidate is recognized for location L1. As can be seen, this prior art processor consistency methodology is based entirely on managed delays.

Figure 8A:
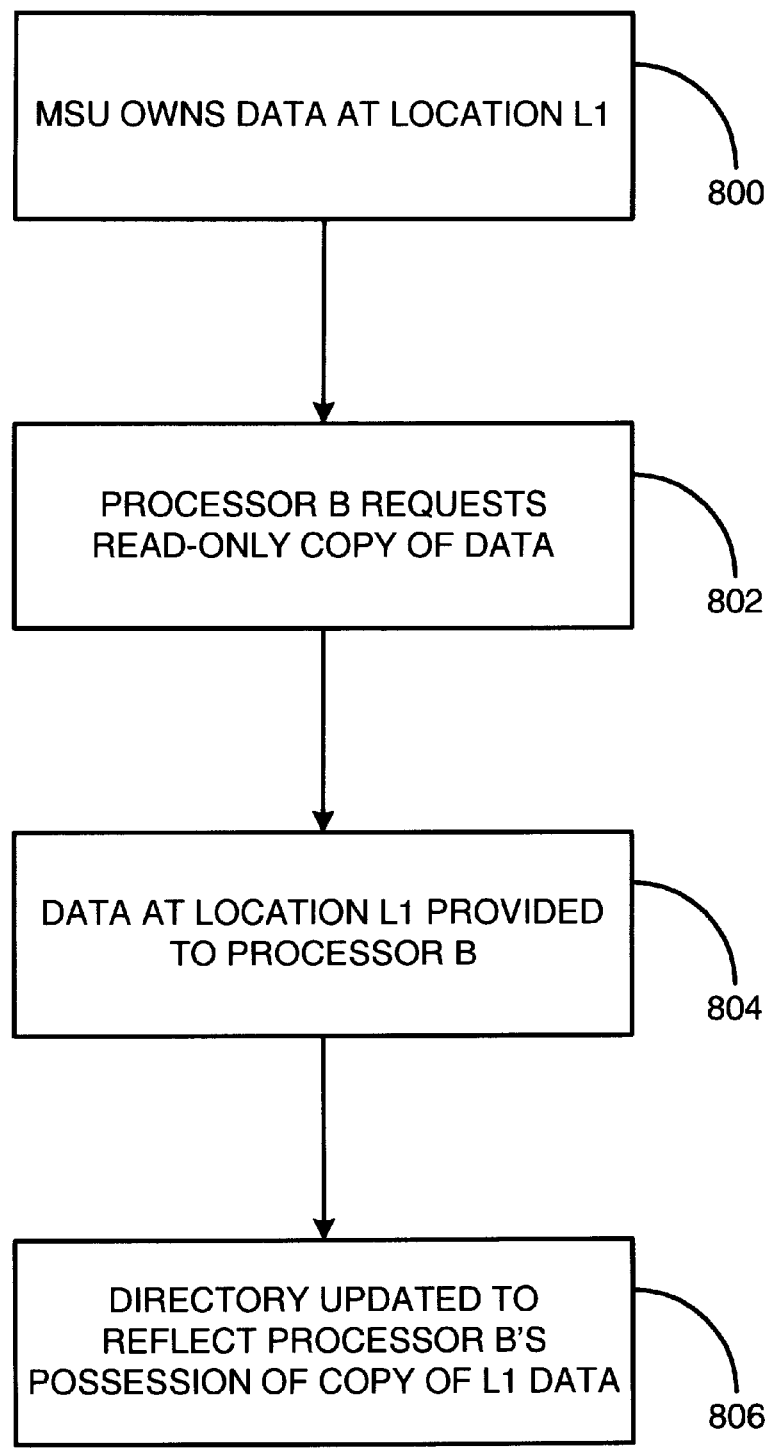
FIG. 8A is a flow diagram illustrating one manner in which a processor in a multi-processing system obtains a copy of data from the MSU.

FIG. 8A is a flow diagram illustrating one manner in which a processor in a multi-processing system obtains a copy of data from the MSU. In this example, the MSU is the owner of data to which a processor, for example Processor B, wants to obtain a copy. This is shown at block 800, where the directory storage indicates that the MSU is the current owner of the data to which Processor B is requesting. In this example, Processor B requests a read-only copy of the data as shown at block 802. The requested data at location L1 is provided 804 to Processor B by the MSU. The directory storage is then updated 806 to reflect Processor B's possession of a copy of the L1 data. At this point, the status of this data at location L1 stored in the directory storage indicates that the MSU is still the owner of the data, and that Processor B is in possession of a read-only copy of the data at location L1.

Figure 8B:
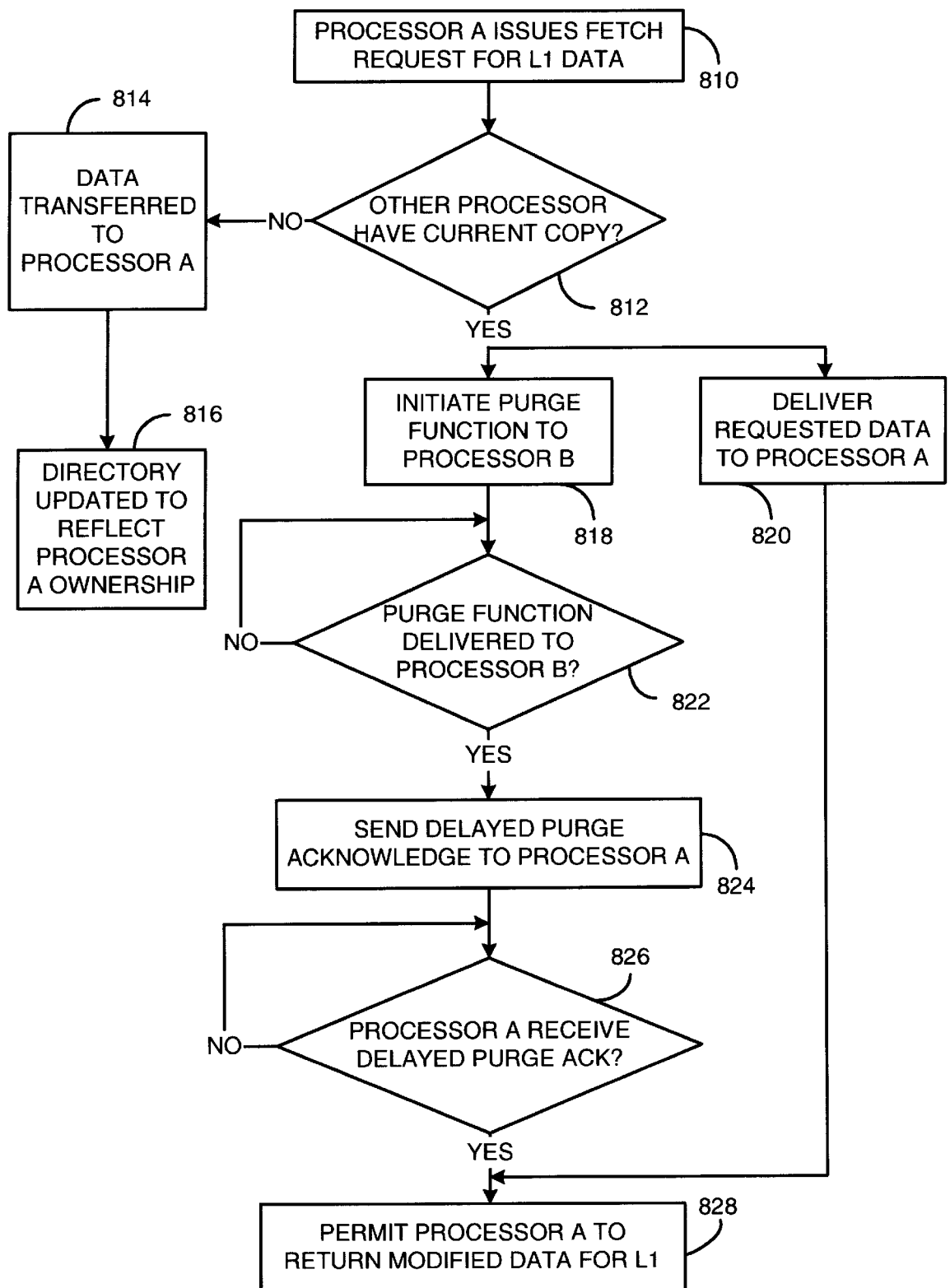
FIG. 8B is a flow diagram illustrating one embodiment of a manner of efficiently maintaining processor coherency in accordance with the principles of the present invention.

At some later time, another processor in the multiprocessing system may request ownership of the data at location L1. FIG. 8B is a flow diagram illustrating one embodiment of a manner of efficiently maintaining processor coherency in such a case, in accordance with the principles of the present invention. Another processor, such as Processor A, may request permission to update or modify the data at location L1 rather than merely obtain a copy of the data. In such a case, Processor A issues 810 a fetch request for the data at location L1. The MSU or other structure managing the directory storage determines 812 whether any other processors have a current copy of the requested data. If not, the requested data is transferred 814 to the requesting Processor A. The directory storage is then updated 816 to reflect that Processor A has ownership of that data.

If, however, the directory storage indicates that one or more other processors are in possession of a read-only copy of the data as determined at block 812, the MSU initiates 818 a purge function to the processors having a read-only copy of the data, for example, Processor B. The purpose of the purge function is to notify Processor B that its copy of the data at location L1 will no longer be valid, since another processor (Processor A) has been authorized to modify the data at that location. However, the MSU does not wait for this purge function to be sent prior to delivering the data to the requesting processor, Processor A. Rather, as soon as the data is available from the MSU data storage, a first data response signal and the data is delivered 820 to the POD associated with Processor A. Therefore, the data is delivered 820 and parallel with the execution of the purge function 818. The purge function targeted for Processor B can sometimes be delayed prior to being delivered to Processor B, such as in the case where the purge function is delayed due to various queuing functions in the path of the purge function. It is therefore determined 822 when the purge function is actually delivered by the MSU to Processor B, and when actually delivered, a second and new response, called a delayed purge acknowledge, is sent back to the POD containing the requesting Processor A as shown at block 824. In other words, both the data delivery and the processor coherency action will have their own separate, independent responses. The delayed purge acknowledge signal provides an indication of when the purge function was actually delivered from the MSU to the POD containing Processor B.

When Processor A receives the delayed purge acknowledge response as determined at block 826, the requesting Processor A is then permitted to return the modified data at location L1 to the MSU for use by other processors such as Processor B. Further, where Processor A was to modify the data at locations L1 and L2, Processor A also recognizes that the data at location L2 cannot be returned to the MSU for use by other processors such as Processor B until location L1 has been returned. Returns to the MSU from a single processor must occur in order. Because the purge acknowledge response indicates that a purge has been delivered to Processor B prior to sending the purge acknowledge response back to the requesting processor, and because the requesting Processor A will not release the data for location L2 until it receives the delayed purge acknowledge response for location L1, processor consistency is maintained.

Figure 9:
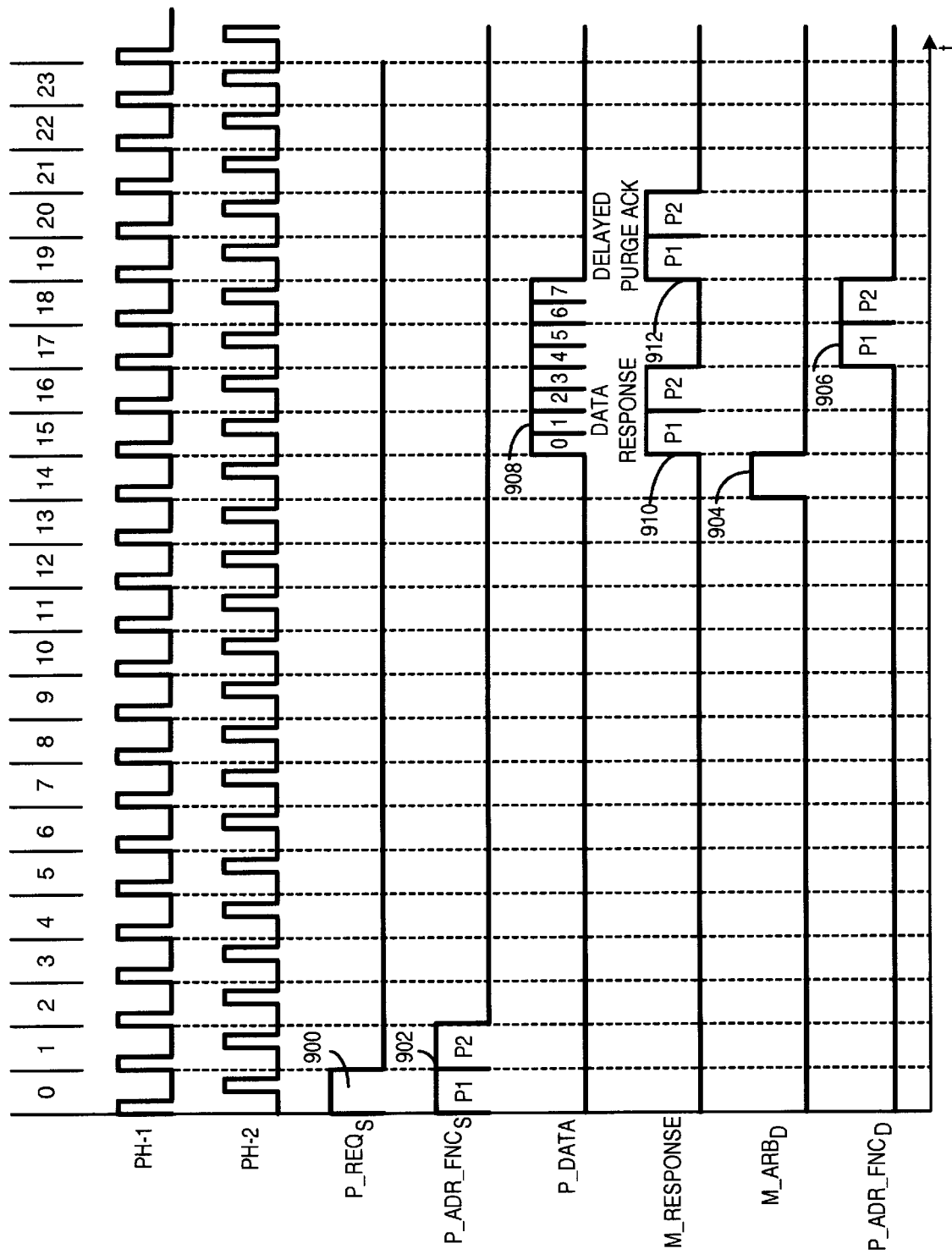
FIG. 9 is a timing diagram illustrating one manner in which the present invention maintains processor consistency in a multiprocessing system.

FIG. 9 is a timing diagram illustrating one manner in which the present invention maintains processor consistency in a multiprocessing system. In this example, the data delivery from a storage location to the requesting device is performed in parallel with the delivery and execution of the purge function. For purposes of example, assume that Processor A issues a fetch request to obtain data from location L1 with the intention of modifying the data. Again using the example computing environment described in connection with FIGS. 1–5, this would be accomplished via Processor A's corresponding POD which activates the P_REQ$_S$ request pulse 900, and specifies the fetch command and address using address/function signal P_ADR_FNC$_S$ at pulse 902. In this example, it requires two clock cycles (shown on phases 0, 1) to transfer the full command and address to the MSU. After reading the Directory Storage, the MSU determines that another requester (e.g., Processor B) has a copy of the data segment corresponding to location L1. The MSU sends a "purge" or "invalidate" function to Processor B for that location, so that Processor B does not attempt to utilize its locally-stored copy of the data. This is accomplished using the M_ARB$_D$ and P_ADR_FNC$_D$ signals illustrated by pulses 904 and 906 respectively. The M_ARB$_D$ signal arbitrates for the direction of the address bus such that the MSU can present the purge function and address location L1 to the POD corresponding to Processor B. When the MSU is granted priority, which is accomplished in a distributed priority manner between the POD and MSU, the MSU transfers the function and address to the POD using signal P_ADR_FNC$_D$, which in this example is initiated three clock cycles later.

However, in this case, the MSU does not wait for the purge function to be sent before delivering the data segment and the data response signal to the requesting Processor A. Instead, as soon as the data is available from the MSU Data Storage, the data is delivered to Processor A using signals P_DATA shown by data pulses 908, and the data response signal is delivered to Processor A using signals M_RESPONSE shown by data pulses 910 and initiated at clock cycle 15. The data, represented by P_DATA pulses 908, includes eight 8-byte data transfers (Bytes 0–7) resulting in a 64-byte data transfer, which in this case is a "cache line" of data. The data response signal represented by pulses 910 performs synchronization and tracking information.

When the purge function represented by the P_ADR_FNC$_D$ signals on pulses 906 are actually "delivered" to Processor B (which currently has a copy of the requested cache line), a second and new response, the Delayed Purge Acknowledge signal represented by pulses 912, is transferred back to the POD containing Processor A from the MSU. The MSU will not deliver the Delayed Purge Acknowledge signals 912 until the MSU has delivered the purge/invalidate signal to Processor B via the POD interface (e.g., MI 130 shown in FIG. 1). Therefore, Processor A receives two "response" (M_RESPONSE) indications: the Data Response signal 910, and the Delayed Purge Acknowledge signals 912. The Data Response signal 910 is used for synchronization and tracking of the data and is provided concurrently with the transfer of the data to Processor A. The Delayed Purge Acknowledge signal 912 is used to manage the processor consistency situation. These separate and independent responses allow Processor A to receive the data as soon as possible with no fixed latencies, while still providing a means to maintain processor consistency. When Processor A receives the Delayed Purge Acknowledge signal, it is permitted to modify location L1, and can also modify the data at location L2 assuming it already had exclusive ownership of location L2.

A primary advantage of the present invention over the prior art is that four clock cycles of read latency can be saved in systems which employ a directory based coherency scheme. This savings in read latency translates into significant performance increases for those cases where a cache value purge is required. For example, in FIG. 9, the data is delivered at clock cycle 15 and the Delayed Purge Acknowledge response is transmitted to the requesting POD when the invalidate signal has been delivered to the POD containing a copy of the requested data. In this way, the data is immediately delivered to the requesting POD to make use of the time required for the processor requiring a purge function to receive the purge signal. The Delayed Purge Acknowledge response essentially validates the data at the requesting processor when the MSU has issued the purge signal to the processor cache that has a copy of the data to be modified.

Figure 10:
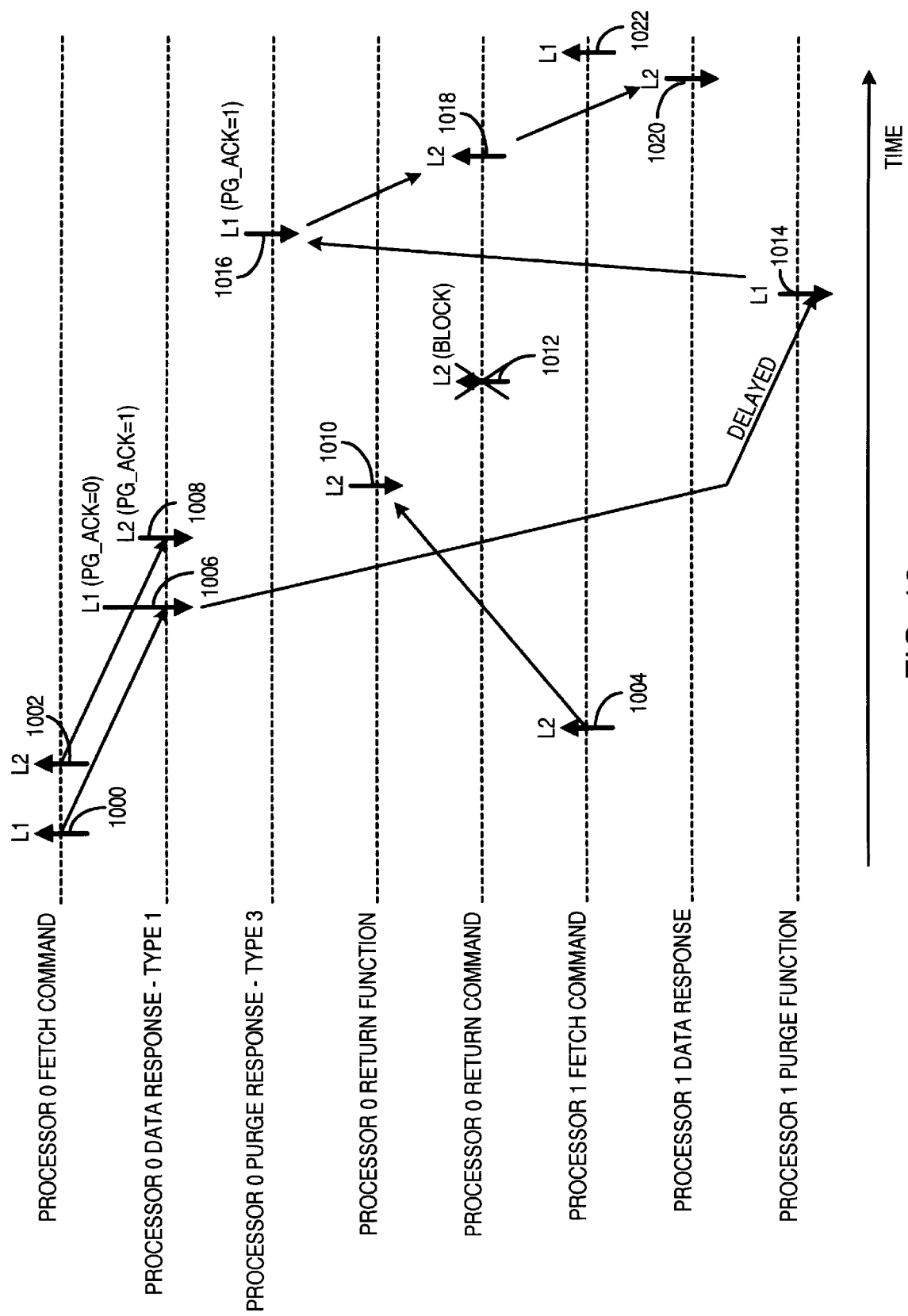
FIG. 10 illustrates the format of the response signals from the MSU to the POD in accordance with one embodiment of the invention.

FIG. 10 illustrates the format of the response signals from the MSU to the POD in accordance with one embodiment of the invention. In one embodiment, the response signal is a two-cycle signal capable of several formats. For purposes of the present invention, two specific formats of the response signal will be discussed. The first response, labeled a Type 1 response, is the MSU's response to a particular processor's data fetch request. The format of a Type 1 response is illustrated in Table 1 below:

TABLE 1

| | MSU Response to TLC Fetch With Data (TYPE 1) | | | | | | |
|---|---|---|---|---|---|---|---|
| | 6 | 5 | 4 | 3 | 2 | 1 | 0 |
| Cycle 1 | D_FLG =1 | | | JN[3:0] | | TLC | R_BUS |
| Cycle 2 | X | X | D_ORIG | OLD_TLC_STATE | | PG_ACK | P_BUS |

| | |
|---|---|
| D_FLG | Data Flag = 1 indicates existence of corresponding data (P_DATA) associated with this response and the job number (JN) is in the first cycle of the response signal. |
| JN[3:0] | The Job Number field contains a unique code that links the response to the original request from the POD, and comes from the JN[3:0] field of the P_ADR_FNC signal. |
| TLC | The third level cache field indicates whether the response if for a third level cache (TLC=1) or an MIO bus (TLC=0) and comes from the TLC field of the P_ADR_FNC signal. |
| R_BUS | The requester bus field indicates which of two requester buses this response is destined for and comes from the R_BUS field of the P_ADR_FNC signal. If TLC=1, the R_BUS indicates which of the TLCs made the request; if TLC=0, the R_BUS indicates which of the MIO busses made the request. |
| P_BUS | The processor bus field indicates which of the processor busses behind a TLC this response is destined for, and comes from the P_bus field of the P_ADR_FNC signal. |
| PG_ACK | The purge acknowledge signal, when asserted (e.g., PG_ACK=1), indicates that all the necessary purges have been transmitted by the MSU to the appropriate POD. When cleared (e.g., PG_ACK=0), indicates that purge functions are required and have not yet been delivered from the MSU. |
| OLD_TLC_STATE | This field indicates the requesting TLC's previous state; i.e.: 00 - no previous record of an outstanding copy exists for this TLC in the MSU directory 01 - a previous copy of this cache line was requested earlier for this TLC |
| D_ORIG | When asserted (e.g., D_ORIG=1), ownership is being delivered to the requester |

Table 1 depicts the format of a Type 1 response signal used to validate data delivered the MSU to a processor that performed a fetch request. In one embodiment of the invention, the response has 14 available bit locations for transferring information from the MSU to the POD in two sections with each section requiring one clock cycle to transfer.

The first format shown in Table 1 is used to inform the POD that data is being transferred to that POD in response to a fetch request. The POD is notified that data is associated with this response due to the D_FLG at bit location 6 being set equal to 1. This bit also informs the POD that the Data Response signal, such as Data Response 910 of FIG. 9, is a Type 1 response.

There are several other fields that make up the response signal for a Type 1 response. The JN field is the job number field that matches the response to the original request from the POD. The TLC field indicates whether the data is associated with the third level cache or the I/O subsystem. The R_BUS field indicates which of two TLCs or I/O subsystems to which the response is destined. The P_BUS indicates which of the Processor BUS is associated with a third level cache that the data is destined for. The OLD_TLC_STATE field indicates the requesting TLCs previous state.

The remaining two fields in the Type 1 response are the PG_ACK and the D_ORIG fields. The D_ORIG field, when asserted, indicates the write ownership has been granted to the requester. The PG_ACK field indicates whether the purge function has been held up or whether all the necessary purges have been transmitted by the MSU to the appropriate POD(s) containing a copy of the requested data. To obtain an understanding of how the PG_ACK and D_ORIG bits interact, the following example is provided. If a POD makes a third level cache fetch request, and if the directory indicates that the MSU owns the cache line and no caches have copies of the requested cache line, then no purge is required and the PG_ACK bit is set. If the request from the POD was for data write privileges, then the D_ORIG is set indicating that ownership is granted. When the requesting device receives this Data Response with the PG_ACK bit set, the requesting device recognizes that no delayed purge will occur, and it will permit the release of any requested data returns (i.e., data storing functions).

However, if the requesting device (e.g., Processor A) makes a fetch request for data with write privileges, and if the directory state indicates that there are copies of the requested data residing in one or more other cache memories (e.g., Processor B's cache, or any other cache associated with a device other than the requesting device), then the Type 1 M_RESPONSE signal 910 returned with the data will have the PG_ACK bit cleared (PG_ACK=0). This indicates to the requesting device that other cache memories have copies of the requested cache line, and that it must wait to receive the Delayed Purge Acknowledge signal 912 before it can permit the release of any requested data returns. The Delayed Purge Acknowledge signal 912 comes in the form of a Type 3 M_RESPONSE signal, which as indicated in Table 2 below, has the PG_ACK bit set (PG_ACK=1).

TABLE 2

MSU Response to Delayed Purge Acknowledge (TYPE 3)

| Cycle | 6 | 5 | 4 | 3 | 2 | 1 | 0 |
|---|---|---|---|---|---|---|---|
| Cycle 1 | D_FLG=0 | DP=0 | RSP_CODE=010 | | | TLC | R_BUS |
| Cycle 2 | X | | JN[3:0] | | | PG_ACK=1 | P_BUS |

| | |
|---|---|
| D_FLG | Data Flag = 0 indicates that there is no corresponding data (P_DATA) associated with this response and the job number (JN) is in the second cycle of the response signal. |
| DP | The data present field, when not asserted, indicates that there is no corresponding data associated with this response. |
| RSP_CODE | The response code field is a 3-bit code defining the type of response when there is no data associated with the response (i.e., when DP=0). (In the case of a Delayed Purge Acknowledge, the RSP_CODE=010 in this example) |
| TLC | The third level cache field indicates whether the response if for a third level cache (TLC=1) or an MIO bus (TLC=0) and comes from the TLCs field of the P_ADR_FNC signal. |
| R_BUS | The requester bus field indicates which of two requester buses this response is destined for and comes from the R_BUS field of the P_ADR_FNC signal. If TLC=1, the R_BUS indicates which of the TLCs made the request; if TLC=0, the R BUS indicates which of the MIO busses made the request. |
| P_BUS | The processor bus field indicates which of the processor busses behind a TLC this response is destined for, and comes from the P_bus field of the P_ADR_FNC signal. |
| PG_ACK | The purge acknowledge signal, when asserted (e.g., PG_ACK=1), indicates that all the necessary purges have been transmitted by the MSU to the appropriate POD. |
| JN[3:0] | The Job Number field contains a unique code that links the response to the original request from the POD, and comes from the JN[3:0] field of the P_ADR_FNC signal. |

Therefore, the Type 3 M_RESPONSE signal (Delayed Purge Acknowledge 912) signal informs the requesting processor of when it can return the cache lines (locations L1 and L2) that it is modifying to the main memory. The MSU will issue the Delayed Purge Acknowledge signal 912 only when it has delivered all of the necessary purge/invalidate functions required for this cache line. Otherwise processor consistency would be jeopardized. However, by using the Type 3 Delayed Purge Acknowledge signal 912 in connection with the Type 1 Data response 910, latencies in delivering the data to the requesting processor are minimized.

In one embodiment, the Type 3 M_RESPONSE (Delayed Purge Acknowledge) signal 912 identified in Table 2 above also includes two additional fields as compared to the Type 1 M_RESPONSE signal 910. First, the DP field indicates whether data is associated with the response. In the case of the Delayed Purge Acknowledge signal, no data accompanies this response, and the DP field is cleared to indicate that there is no corresponding data associated with this response. The RSP_CODE field is used in such a case where there is no data associated with the response, and indicates what type of no-data response it is. This field is used because there may be other types of responses that do not have corresponding data but is not a Delayed Purge Acknowledge signal. In the case of a Delayed Purge Acknowledge signal, the RSP_CODE is set to a predetermined value that indicates that the response is a Delayed Purge Acknowledge response. As will be appreciated by those skilled in the art, the DP and RSP_CODE fields are not necessary where no other responses have no corresponding data. These fields simply provide flexibility in providing various types of responses within a common format. Alternatively, the Delayed Purge Acknowledge response in accordance with the present invention could have each field set to a fixed value corresponding to the Delayed Purge Acknowledge response only.

FIG. 10 is a sequence diagram of one embodiment of the invention as it relates to the processor consistency rule. For purposes of this example, Processor 0 is performing a data store to location L1 and L2 in two separate cache lines. Processor 1, on the other hand, will execute a read of location L2 followed by a read of location L1. In the example of FIG. 10, arrows pointing up represent the flow of information from a processor to the MSU, and arrows pointing down represent the transfer of information from the MSU to a processor.

In this example, Processor 0 issues two fetch requests for locations L1 and L2 as depicted by arrows 1000 and 1002. This, of course, assumes that the data at locations L1 and L2 does not reside in Processor 0's cache. Also in this example, it is assumed that Processor 0 intends to modify the data rather than simply obtain a read-only copy of the data, and therefore also needs to obtain ownership of the data at locations L1 and L2 from the MSU. When it ultimately receives the data, it will modify the data accordingly, and store the results in its cache until they are aged out or until another processor requests the updated information via the MSU.

Referring again to FIG. 10, shortly after Processor 0 issues the two fetches (1000, 1002), Processor 1 issues a fetch request for the data at location L2 as indicated at arrow 1004. For purposes of this example, it is assumed that the data associated with location L12 is not in Processor 1's cache, and also that the data associated with location L1 is located in Processor 1's cache and therefore needs to be invalidated since Processor 0 has made a request for the data at location L1. When the MSU recognizes Processor 0's request for the data at location L1, it references the directory storage and determines that there is a copy of the data at location L1 in Processor 1's cache. The MSU then attempts to issue a purge function to Processor 1 for location L1. However, because the MSU must manage multiple requests from various processors throughout the system, it is possible that the purge function targeted for Processor 1 is awaiting transmission and is temporarily stored in a queue. This often happens where there is a large amount of other activity associated with the MSU requiring the purge function to be stored in a queue until the MSU and the MSU/POD interface is available. The MSU will issue a Type 1 data response and provide the data with ownership to Processor 0, but it will clear the PG_ACK bit in the Type 1 response as depicted by arrow 1006. The MSU then turns its attention to Processor 0's fetch request for location L2. In this example, while the MSU is accessing data storage for Processor 0's fetch request for location L2, the MSU receives the request for the data at location L2 from Processor 1. The MSU defers this request until it has delivered the data to Processor 0 for location L2 as depicted by arrow 1008. Subsequently, the MSU processes the deferred request for Processor 1. The MSU reads its directory storage, and determines that Processor 0 has ownership of the cache line for location L2. The MSU then issues a return function to Processor 0 for location L2 as shown by arrow 1010. When the bus control for Processor 0 recognizes the return function depicted by arrow 1010, Processor 0's bus control will block the return of the new data back to the MSU due to Processor 1's request for this data, because Processor 0 has not yet received the Delayed Purge Acknowledge response for the previous request, namely the data at location L1. Processor 0's blocking of the return of the new data back to the MSU is depicted by arrow 1012.

When the purge function for location L1 finally reaches the top of the MSU queue, the purge function is delivered to Processor 1 via its POD interface, as illustrated by arrow 1014. The MSU will also issue a Type 3 response with the PG_ACK bit set (Delayed Purge Acknowledge) as seen by arrow 1016. This Type 3 response is sent from the MSU back to the bus controller for Processor 0. This Delayed Purge Acknowledge response releases the bus controller for Processor 0 to allow it to issue the return command for the previous data store, namely the cache line for location L2 as seen by arrow 1018. This cache line is returned to the MSU which in turn routes the data associated with location L2 to Processor 1 as shown by arrow 1020. Processor 1 will now recognize the new data in location L2 as previously modified by Processor 0. Since the POD keeps responses and purge functions in order for the same requester, the purge for location L1 to Processor 1 occurred before the data delivery of the cache line for location L2. When Processor 1 reads location L1, it will recognize a cache miss and will issue a fetch request to memory to obtain the new value as depicted by arrow 1022. The MSU will in turn obtain the new value from Processor 0 (who still has ownership of the data associated with location L1), and will deliver the data to Processor 1. Therefore, Processor consistency is preserved, and the acceleration of the data to Processor 0 has been accomplished in accordance with the invention.

Figure 11:
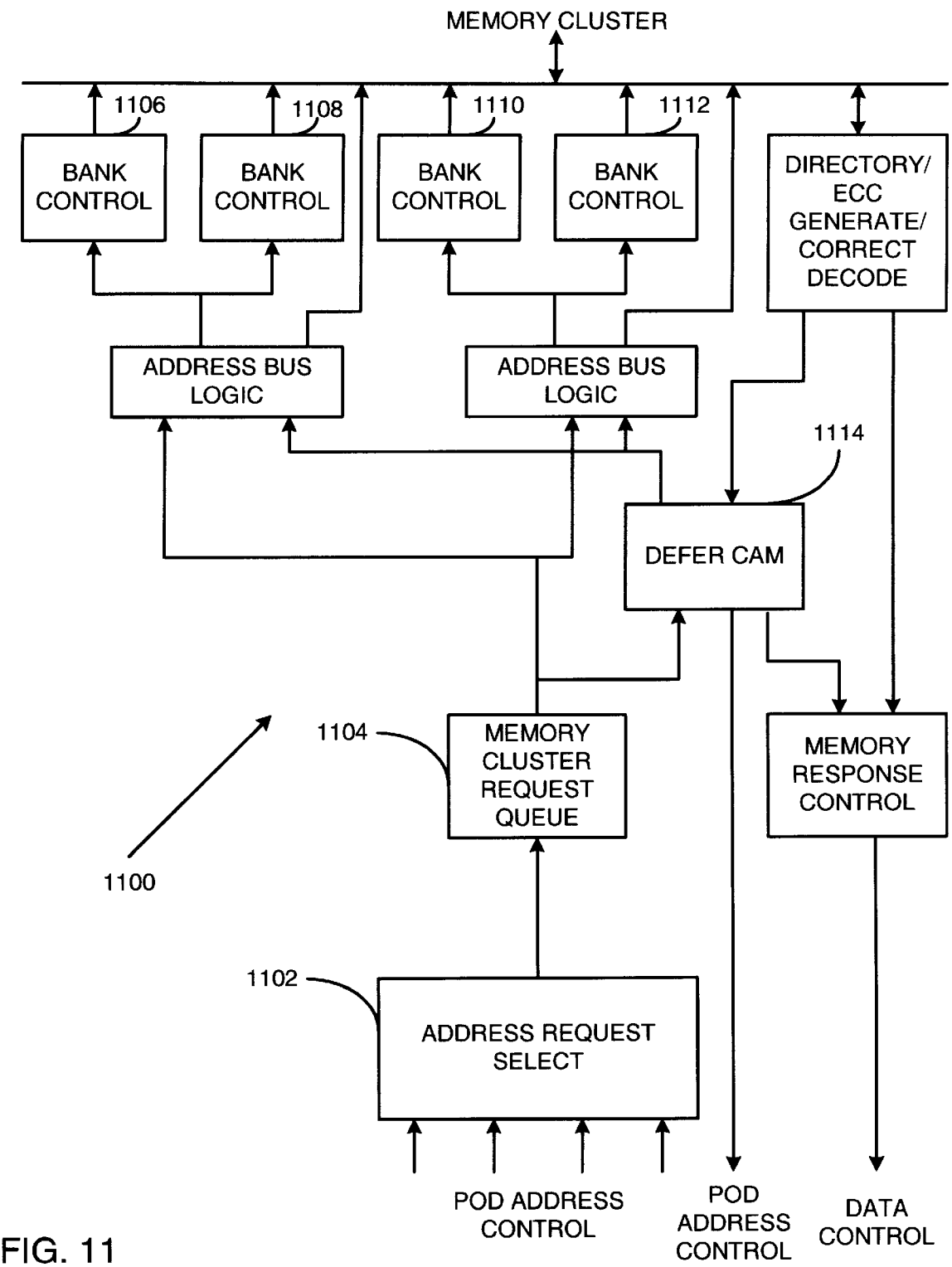
FIG. 11 is a block diagram illustrating one embodiment of the MSU Memory Cluster Control where processor consistency handling is performed.

FIG. 11 is a block diagram illustrating one embodiment of the MSU Memory Cluster Control where processor consistency handling is performed. A fetch request from one of the POD interfaces is directed to the Address Request Select Queue 1102. On each clock cycle, one of these requests is selected by the Address Request Select Queue 1102 and is routed to the Memory Cluster Request Queue 1104 where it awaits access to one of four Bank Control areas 1106, 1108, 1110, and 1112. A Bank Control is essentially selected based on predetermined bits of the incoming address information. The bank control is responsible for initiating a storage cycle. Items are selected out of the Memory Cluster Request Queue 1104 based on whether the identified Bank Control circuit is busy, and also on the type of memory request (e.g., I/O, fetch, store, etc.). The Bank Control is available when there is no current access to its resources, such as address bus busy, data bus contention, and refresh, which will prevent access to the bank. If the request is a fetch request, it will also automatically enter the Defer CAM (Content Addressable Memory) 1114. The Defer CAM 1114 is the mechanism that handles conflicts to the same cache line, such as in the case of consistency. A fetch type request is placed in the Defer CAM 1114, and when all aspects of the fetch are complete, it is thereafter removed from the Defer CAM.

The Defer CAM 1114 is essentially a mechanism including a comparator for each location of the storage CAM. In one embodiment, the storage CAM 1114 is eight locations deep, and can therefore hold up to eight fetch requests. If the CAM fills, it will stop the Memory Cluster Request Queue 1104 from issuing additional fetches, and incoming fetches will accumulate in the queue until it fills completely, at which time another hold line will stop incoming requests.

When another fetch request is presented to the CAM 1114 from the Memory Cluster Request Queue 1104, it is compared against all other valid locations of the CAM. If there is a match, it is linked to the last item it matches to in a linked list fashion. In other words, it is deferred until all previous items to which it is linked are completed. What completes and removes an entry from the Defer CAM 1114 is based on the state of the MSU directory at the time the fetch is originally made. If the directory state indicates that the MSU owns the cache line, then the entry is removed from the Defer CAM 1114 when the response is issued. If the directory state indicates that the state is "shared" and the fetch request necessitates invalidation of shared copies, then the item is not removed until the Delayed Purge Acknowledge signal is issued. If the directory state identifies the state as being "exclusive", then the entry is not removed until the return command is received from the POD that has exclusive ownership.

Fetches in the Defer CAM 1114 are completed in the order they are linked, which in essence is a first-in-first-out (FIFO) order. The mere presence of one item in the list prevents another item with the same address from obtaining indeterminate results because of the finite amount of time it takes to complete a fetch transaction.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for reducing data transfer delays in a transaction processing system which includes a plurality of devices each having an associated local memory, and a supervisory memory module having a main storage module for storing data segments and a directory storage for maintaining ownership status of each data segment stored in the main storage module and the local memories, wherein a first one of the devices includes a first local memory storing a copy of a data segment requested by a second one of the devices, the method comprising:

transferring a data transfer request for the requested data segment from the second device to the supervisory memory module, wherein the data transfer request includes an identifier requesting permission to modify the requested data segment;

delivering the requested data, and a data transfer response, to the second device upon receipt of the data transfer request, wherein the data transfer response provides modification privileges of the requested data segment to the second device;

issuing a purge command to the first device to invalidate the copy of the requested data segment in the first local memory;

delivering a purge acknowledge response to the second device upon issuance of the purge command to the first device, wherein the purge acknowledge response provides an indication that the copy of the requested data in the first local memory has been invalidated.

2. The method of claim 1, further comprising modifying the data at the second device upon receipt of the data transfer response and prior to a time of receipt of the purge acknowledge response.

3. The method of claim 2, further comprising prohibiting the second device to release the modified data until the purge acknowledge response is received.

4. The method of claim 1, further comprising:

transferring a second data transfer request for a second requested data segment from the second device to the supervisory memory module subsequent to the data transfer request first transferred;

transferring a third data transfer request for the second requested data segment from the first device to the supervisory memory module subsequent to the second data transfer request; and prohibiting the second device to release the requested data segment and the second requested data segment until the purge acknowledge response is received by the second device.

5. The method of claim 1, further comprising determining whether the first device is storing a copy of the requested data segment by analyzing the ownership status of the requested data segment in the directory storage.

6. The method of claim 5, wherein issuing the purge command comprises issuing the purge command upon recognition that the ownership status identifies that the first device is in possession of a copy of the requested data.

7. The method of claim 6, further comprising revising the ownership status to reflect the second device as a new owner of the requested data segment, and delivering the data transfer response upon revision of the ownership status.

8. The method of claim 1, wherein delivering the requested data segment and the data transfer response comprises concurrently delivering the requested data segment and the data transfer response to the second device, and allowing the second device to modify the requested data segment upon receipt of the modification privileges in the data transfer response.

9. The method of claim 8, further comprising prohibiting the second device from returning the requested data segment to the supervisory memory module or to other local memories where the requested data segment is requested by another device, until the purge acknowledge response is received by the second device.

10. The method of claim 1, further comprising:

generating the purge command at the supervisory module;

queuing the purge command with other commands generated at the supervisory memory module;

scheduling the purge command for issuance in accordance with a predetermined priority procedure; and issuing the purge command to the first device when the purge command gains priority in accordance with the predetermined priority procedure.

11. A system for maintaining processor consistency in a transaction processing system including a plurality of devices each having an associated local memory, wherein a first device includes a first local memory storing a copy of a requested data segment subject to a first data fetch request by a second device, and wherein the first device or any device other than the second device subsequently initiates a second data fetch request for the requested data segment, the system comprising:

(a) a supervisory memory module comprising:

(i) a directory storage for maintaining ownership status of the requested data segment, wherein the ownership status reflects that the first device has a copy of the requested data segment;

(ii) a data storage module having a main storage module to store data segments, to deliver the requested data segment and a data transfer response to the second device in response to the first data fetch request, and to issue a purge command to the first device to direct the first device to invalidate its copy of the requested data segment;

(b) means for allowing the second device to modify the requested data segment in response to the data transfer response, and for prohibiting a release of the modified data segment from the second device until receipt of the purge command by the first device is acknowledged;

(c) a content addressable memory (CAM) coupled to store the second data fetch request prior to its release to the supervisory memory module;

(d) wherein the supervisory memory module issues a purge acknowledge command upon delivery of the purge command to the first device to allow the release of the modified data segment from the second device and to allow the second data fetch request to be released from the CAM to the supervisory memory module.

12. The system as in claim 11, wherein the CAM comprises:

a plurality of storage locations to store a plurality of data transfer requests;

a comparing circuit to compare the second data fetch request to the plurality of data transfer requests stored in the plurality of storage locations; and wherein the CAM prohibits the release of the second data fetch request until it receives the purge acknowledge command.

13. The system as in claim 12, further comprising a memory bank control module coupled to the CAM to receive the data transfer requests upon release by the CAM, wherein the memory bank control module forwards the data transfer requests to the supervisory memory module.

14. A processor consistency system for reducing data transfer delays in a transaction processing system which includes a plurality of devices each having an associated local memory, and a supervisory memory module having a main storage module for storing data segments and a directory storage for maintaining ownership status of each data segment stored in the main storage module and the local memories, wherein a first one of the devices includes a first local memory storing a copy of a data segment requested by a second one of the devices, the method comprising:

means for transferring a data transfer request for the requested data segment from the second device to the supervisory memory module, wherein the data transfer request includes an identifier requesting permission to modify the requested data segment;

means for delivering the requested data, and a data transfer response, to the second device upon receipt of the data transfer request, wherein the data transfer response provides modification privileges of the requested data segment to the second device;

means for issuing a purge command to the first device to invalidate the copy of the requested data segment in the first local memory;

means for delivering a purge acknowledge response to the second device upon issuance of the purge command to the first device, wherein the purge acknowledge response provides an indication that the copy of the requested data in the first local memory has been invalidated.

15. The processor consistency system as in claim 14, further comprising means for prohibiting the second device to release the modified data until the purge acknowledge response is received.

16. The processor consistency system as in claim 14, further comprising means for allowing the second device to modify the requested data segment upon receipt of the modification privileges in the data transfer response.

17. The processor consistency system as in claim 16, further comprising means for prohibiting the second device from returning the requested data segment to the supervisory memory module or to other local memories where the requested data segment is requested by another device, until the purge acknowledge response is received by the second device.

18. The processor consistency system as in claim 14, further comprising:

means for generating the purge command at the supervisory module;

means for queuing the purge command with other commands generated at the supervisory memory module;

means for scheduling the purge command for issuance in accordance with a predetermined priority procedure; and means for issuing the purge command to the first device when the purge command gains priority in accordance with the predetermined priority procedure.

19. A method for reducing data transfer delays in a transaction processing system which includes a plurality of devices having associated local memories, and a supervisory memory module having a main storage module for storing data segments and a directory storage for maintaining ownership status of each data segment stored in the main storage module and the local memories, wherein a first one of the devices includes a first local memory storing a copy of a data segment requested by a second one of the devices, the method comprising:

requesting possession and ownership of a requested data segment by way of a data fetch request from the second device;

delivering the requested data segment from the supervisory memory module to the second device in response to the data fetch request;

granting the second device ownership privileges, including data segment modification privileges to create a modified data segment;

providing a data purge request to the first device to direct the first device to invalidate its copy of the requested data segment, wherein the data purge request is unable to arrive at the first device prior to the delivery of the requested data to the second device; providing a purge acknowledge indication to the second device upon delivery of the data purge request to the first device; and permitting the second device to return the modified data segment to the supervisory memory module upon receipt of the purge acknowledge indication.

* * * * *